United States Patent [19]

Fujita et al.

[11] Patent Number: 4,763,538
[45] Date of Patent: Aug. 16, 1988

[54] REVERSE DRIVE FOR SMALL VEHICLES

[75] Inventors: Haruyasu Fujita, Tokyo; Yoshiaki Hirosawa; Toshifumi Ito, both of Saitama, all of Japan

[73] Assignee: Honda Giken Kogyo Kabushiki Kaisha, Tokyo, Japan

[21] Appl. No.: 938,211

[22] Filed: Dec. 4, 1986

[30] Foreign Application Priority Data

| Dec. 4, 1985 | [JP] | Japan | 60-272893 |
| Dec. 4, 1985 | [JP] | Japan | 60-272894 |
| Dec. 4, 1985 | [JP] | Japan | 60-272892 |
| Jan. 31, 1986 | [JP] | Japan | 61-019747 |
| Jan. 31, 1986 | [JP] | Japan | 61-019749 |
| Jan. 31, 1986 | [JP] | Japan | 61-019750 |

[51] Int. Cl.⁴ ............................................. F02N 15/02
[52] U.S. Cl. ................................. 74/6; 74/7 E; 74/661; 74/810; 123/179 A; 123/179 M; 180/65.2; 180/219; 192/0.084; 192/0.092
[58] Field of Search ............... 74/6, 7 E, 661, 810; 123/179 A, 179 M; 192/0.084, 0.092; 180/219, 65.2

[56] References Cited

U.S. PATENT DOCUMENTS

| 799,851 | 9/1905 | Hood | 74/6 X |
| 1,822,673 | 9/1931 | Schwenke | 74/6 |
| 1,992,210 | 2/1935 | Higley | 74/686 |
| 3,211,249 | 10/1965 | Papst | 180/65 |
| 4,188,834 | 2/1980 | Wakatsuki et al. | 74/6 X |
| 4,347,813 | 9/1982 | Maucher et al. | 123/179 M X |
| 4,410,071 | 10/1983 | Osterman | 74/6 X |
| 4,422,656 | 12/1983 | Kaplan et al. | 280/3 |
| 4,533,011 | 8/1985 | Heidemeyer et al. | 180/65.2 |

FOREIGN PATENT DOCUMENTS 59-155545 9/1984 Japan.
60-252079 12/1985 Japan.

Primary Examiner—Allan D. Herrmann
Attorney, Agent, or Firm—Lyon & Lyon

[57] ABSTRACT

A reverse drive for small vehicles in which an output shaft of a starter motor disposed independently of a driving internal combustion engine can be coupled to a power transmission system between the internal combustion engine and a rear wheel in such a way that the rear wheel is driven in the reverse direction. The starter motor may be capable of normal and reverse rotations, the normal rotation of the starter motor being transmitted to the internal combustion engine through a starting clutch, and the reverse rotation of said starter motor being transmitted to the power transmission system through a reverse clutch. Otherwise, the starter motor may be capable of rotating only in one direction. In this case, the output of the starter motor is transmitted to the output side of the power transmission system through a reverse remission line while the power transmission system is interrupted.

18 Claims, 30 Drawing Sheets

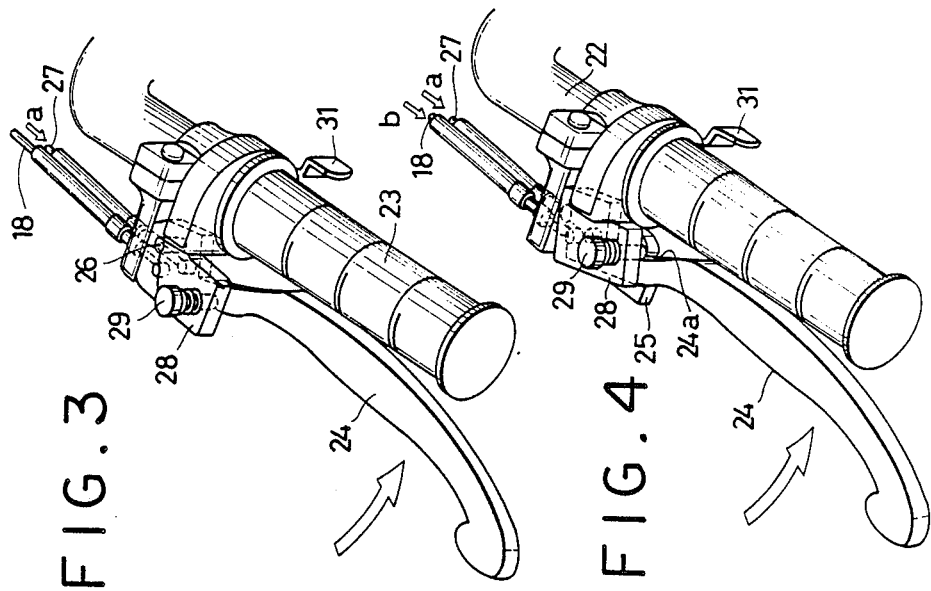
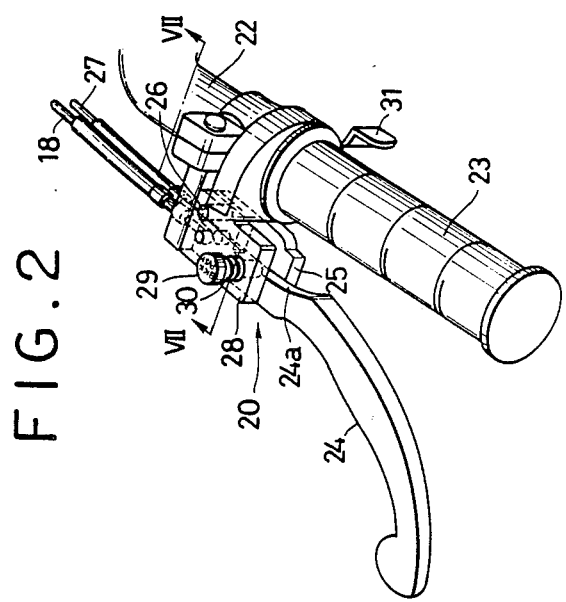

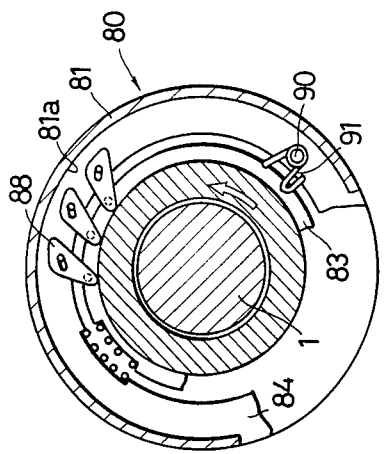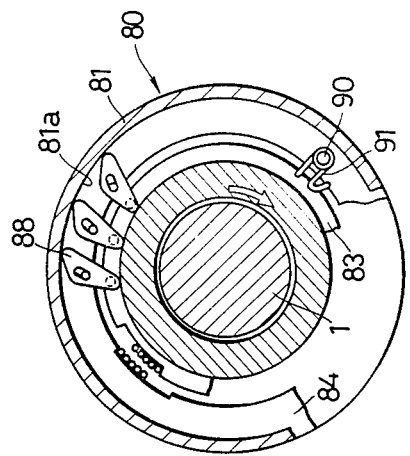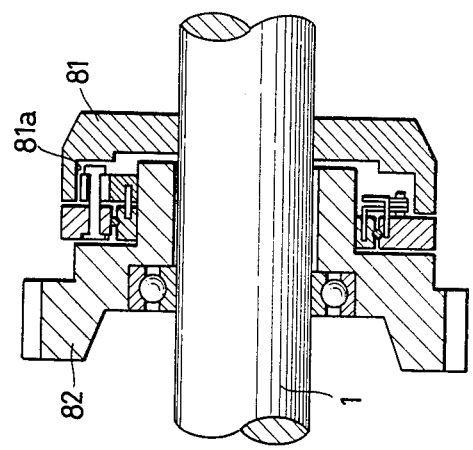

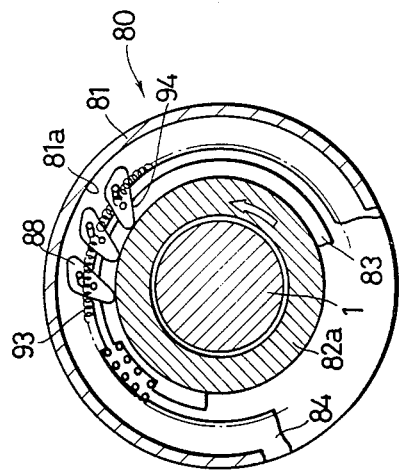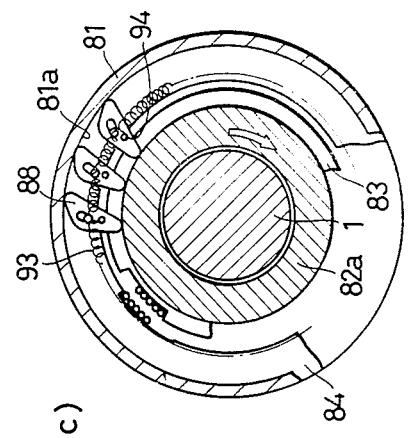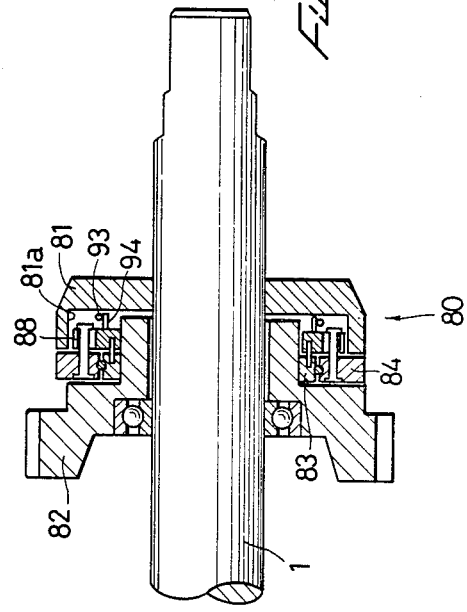

REVERSE DRIVE FOR SMALL VEHICLES

BACKGROUND OF THE INVENTION

The field of the present invention is auxiliary drive mechanisms for small vehicles employed for reverse running of the vehicle.

Reverse drive mechanisms have long been available. Most conveniently on larger vehicles, the mechanism is driven by the principal source of power through a reverse gear in the transmission. It is less convenient to employ such a reverse drive in a smaller vehicle. A reverse drive mechanism, disclosed in Japanese Laid-open Patent Publication No. 155545/1984, is provided in a transmission system for transferring driving power from an internal combustion engine to the wheels of a small vehicle such as motorcycle.

In this mechanism reverse speed was limited by interrupting the spark discharge of the spark plug at a certain speed. However, since the internal combustion engine of the vehicle is used which has a range of stable running speeds well above the idling speed, the reduction ratio of the reverse mechanism should be high to obtain a low backing speed of the vehicle, preferably below 2 km per hour. For satisfying this requirement, reduction gears become too large to be practical.

Another type of reverse drive mechanism for large motorcycles, described in Japanese Laid-open Publication No. 252079/1985 comprises an auxiliary retractable wheel which is connected to an electric motor by means of a reduction mechanism. This mechanism employs a separate auxiliary wheel. The driving force through the auxiliary wheel is resisted by the power transmission line from the internal combustion engine to the rear wheel which must rotate as the motorcycle is driven in reverse. Moreover, the auxiliary wheel contacts the road surface at a position laterally shifted from the line connecting the front and rear wheels, so that the auxiliary wheel is not efficient for pulling the front and rear wheels. Thus, certain disadvantages have existed with reverse mechanisms on small vehicles such as motorcycles.

SUMMARY OF THE INVENTION

The present invention is directed to an improved reverse drive mechanism for small vehicles which is of a practical size and does not require an auxiliary wheel. An output shaft of a starter motor, which is not the internal combustion engine for powering the vehicle, can be connected to the transmission line leading from the internal combustion engine to the rear wheel so as to rotate the rear wheel in reverse. Using this starter motor, the vehicle can be driven in reverse in its erected position.

Furthermore, in the starter motor and the power transmission system, a starter clutch for transmitting the power from the starter motor to the internal combustion engine only in the forward direction and a reverse drive clutch for transmitting the power to the power transmission system only in the backward direction which is opposite to the forward direction and in which the rear wheel is rotated so that the vehicle is driven in reverse are provided in parallel In addition, at least one of the starter clutch and the reverse clutch comprises a slide clutch mechanism which is shifted by the manual operation procedure carried out manually by the driver.

The foregoing and other objections, features and advantages of the invention will be apparent from the following more particular description of the preferred embodiments of the invention as illustrated hereinafter.

BRIEF DESCRIPTION OF THE DRAWING

FIG. 2 is a perspective view of a reverse drive mechanism of a motorcycle;

FIG. 3 and FIG. 4 are perspective views illustrating the operations, respectively, of the reverse drive mechanism;

FIG. 21(a) is a sectional view illustrating major component parts of a modification of a one-way clutch disengaging means;

FIG. 21(b) and FIG. 21(c) are views used to explain the mode of operations of the one-way clutch disengaging means shown in FIG. 21(a) when the engine is started and when the reverse drive mechanism is activated, respectively;

FIG. 22(a) is a sectional view of the major component parts of another modified one-way clutch disengaging means;

FIG. 22(b) and FIG. 22(c) are views used to explain the mode of operations of the one-way clutch disengaging means when the engine is started and when the reverse drive mechanism is activated, respectively;

DETAILED DESCRIPTION OF THE PREFERRED EMBODIMENTS

Referring first to FIGS. 1-10, a first embodiment of a reverse drive mechanism in accordance with the present invention will be described.

The first embodiment is applied to a motorcycle and its reverse drive mechanism will be first described.

Figure 1:
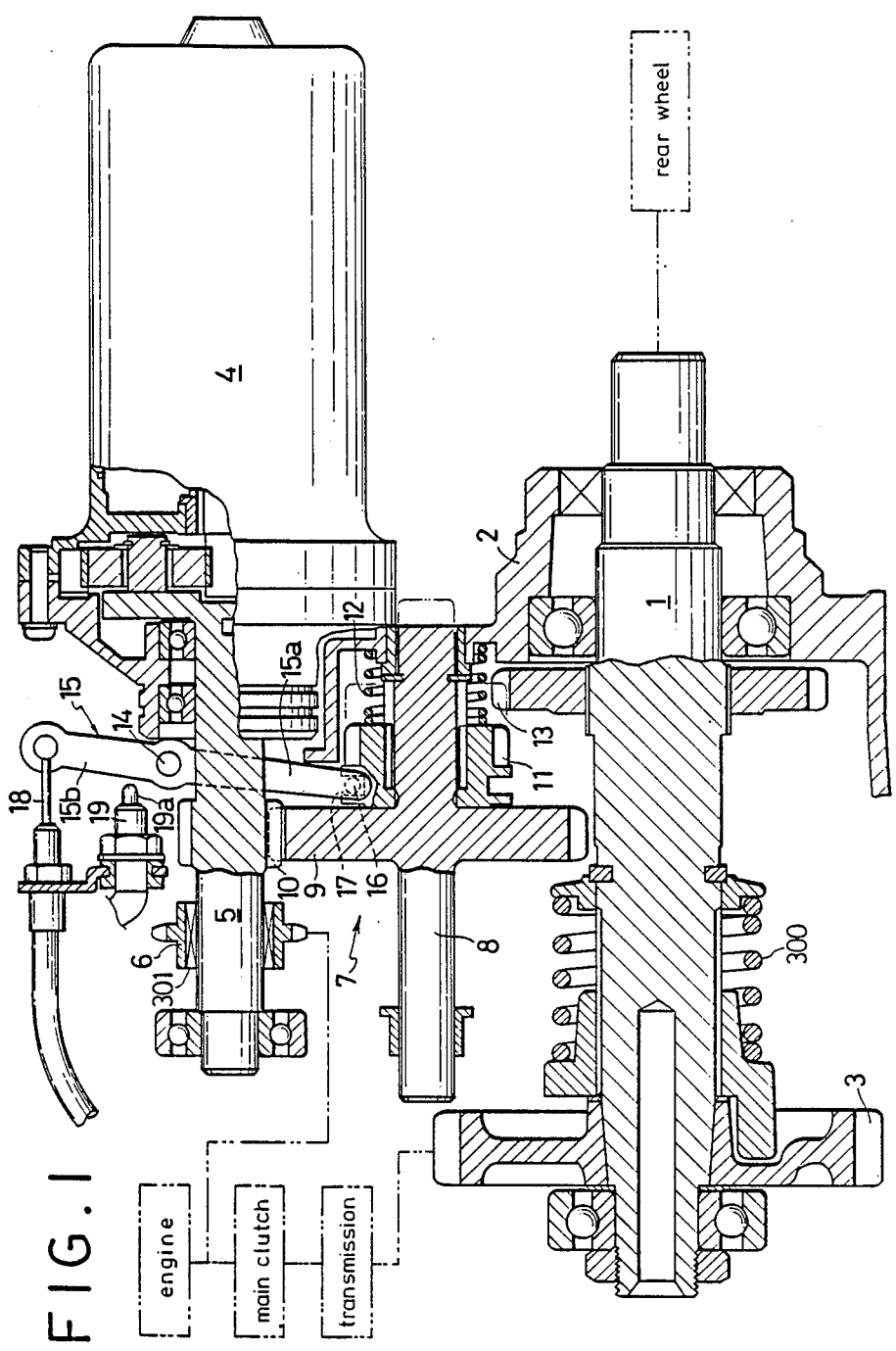
FIG. 1 is a side view of a first embodiment of the present invention applied to a motorcycle illustrating the major component parts thereof.

Referring to FIG. 1, reference numeral 1 designates a driving shaft of a motorcycle which is rotatably supported by an engine crankcase 2, connected through a gear 3 to a transmission (not shown) and is driven by an engine. Reference numeral 300 designates a spring for absorbing a variation of transmitted torque. The driving shaft 1 is connected through a chain drive type or a shaft drive type secondary reduction gear to the rear wheel to drive the same. A starter motor 4 is disposed in parallel with and adjacent to the driving shaft 1. The output shaft 5 of the starter motor 4 is provided with a sprocket 6 incorporating therein a one-way clutch 301 and the sprocket 6 and a crankshaft of the engine or a shaft driven in synchronism with the crankshaft are drivingly coupled through a chain. The one-way clutch engages when the starter motor 4 is rotated in a predetermined direction (in one direction) so that the sprocket 6 rotates in unison with the shaft 5 so that the crankshaft of the engine is driven by the starter motor 4 through the chain, whereby the engine is started. Once the engine is started, the driving power delivered from the engine is not transmitted to the output shaft because the one-way clutch is disengaged and the driving shaft 1 is rotated in the forward direction through a primary reduction gear, a clutch and a transmission.

A reverse switching device 7 is interposed between the output shaft 5 and the driving shaft 1 and is provided with a gear shaft 8 rotable in parallel with the output shaft 5 and the driving shaft 1. A gear 9 mounted on the switching gear shaft 8 is in mesh with a gear 10 carried by the output shaft 5. An idle gear 11 is splined to the switching gear shaft 8 in such a manner that the idle gear 11 is slidable in the axial direction and is rotatable in unison with the switching gear shaft 8. The idle gear 11 is normally biased in the left direction in FIG. 1 under the force of a spring 12 and is pressed against the side surface of the gear 9. When the idle gear 11 slides to the right position indicated by the chain lines in FIG. 1, it engages with a gear 13 carried by the driving shaft 1. Therefore, when the starter motor 4 is rotated in the direction opposite to the direction in which the engine is started under these conditions, the rotating power or torque of the starter motor 4 is not transmitted to the crankshaft of the engine because the one-way clutch incorporated in the sprocket 6 is disengaged, but is transmitted through the gears 10, 9, 11 and 13 to the driving shaft 1. In this case, the driving shaft 1 is rotated in the direction opposite to the direction when driven by the engine so that the rear wheel connected to the driving shaft 1 is rotated backward.

In order to shift the idle gear 11 to the right so that the motorcycle is driven backwardly by the starter motor 4 as described above, a shift lever 15 swingable about the fixed shaft 14 is provided and one arm 15a thereof has an engaging shaft 16 extended therefrom and adapted to engage with an engaging groove 17 of the idle gear 11. The other arm 15b of the shift lever 15 is connected to a switching cable 18 (a traction member) to be described below. When the switching cable 18 is manually pulled, the shift lever 15 rotates about the fixed shaft 14 so that the idle gear 11 is forced slide to the right reverse drive position against the spring 12. A normally open reverse gear switch 19 is disposed adjacent to the arm 15b of the shift lever 15 and upon rotation of the shift lever 15, an actuating member 19a is pushed by the shift lever 15 so that the reverse gear switch 19 is closed.

Figure 7:
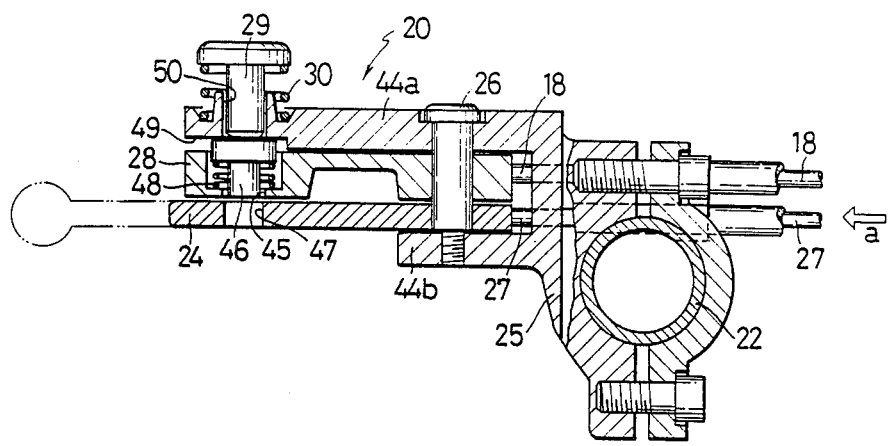
FIG. 7 is a sectional view taken along the line VII—VII of FIG. 2.

Next, a reverse drive operation mechanism 20 for activating the above-described reverse switching device 7 will be described. As best shown in FIGS. 2 and 7, the mechanism 20 is constructed by utilizing a clutch lever 24 pivoted to a steering handle 22.

The clutch lever 24 is pivoted with a hinge pin (a pivot pin) 26 to a supporting member 25 securely joined to the handle 22 and is connected to a clutch cable 27 which in turn actuates the clutch disposed in front of the transmission. Therefore, it has a double function of gradually transmitting the driving power to the speed change gear so that the motorcycle can be started smoothly and interrupting temporarily the power transmission between the engine and the speed change gear in the case of a gear shift so that a desired gear ratio may be selected. The supporting member 25 is bifurcated into an upper arm 44a and a lower arm 44b and the clutch lever 24 is extended along the upper surface of the lower arm 44b. A switching link 28 (link member) is interposed between the upper surface of the clutch lever 24 and the undersurface of the upper arm 44a and is pivoted with the hinge pin 26. The switching cable 18 is connected to the switching link 28 whose outer end portion has a lock pin 46 extended downwardly through a hole 45 toward the clutch lever 24. The clutch lever 24 is formed with an engaging hole 47 adapted to engage with the lock pin 46. The lock pin 46 is normally forced upwardly by a spring 48 so that its head engages with the stepped portion 49 formed at the underface of the upper arm 44a and the lock pin 46 is normally pulled out of the engaging hole 47. The upper arm 44a has a switching button 29 extended downwardly through a hole 50 drilled at the stepped portion 49. The push button 29 is normally pushed upwardly by a spring 30 so that it is not extended downwardly beyond the surface of the stepped portion 49.

Therefore, when the clutch lever 24 is pulled toward the handle 22, only the clutch lever 24 is caused to pivot about the hinge pin 26 so that the clutch cable 27 is pulled in the direction indicated by an arrow a in FIG.

7, thereby releasing the clutch. Since the lock pin 46 remains in its upper position and is therefore out of engagement with the engaging hole 47, the switching link 28 does not swing so that the switching cable 18 is not actuated. The normal clutch operation is normally carried out in the manner described above.

Figure 8:
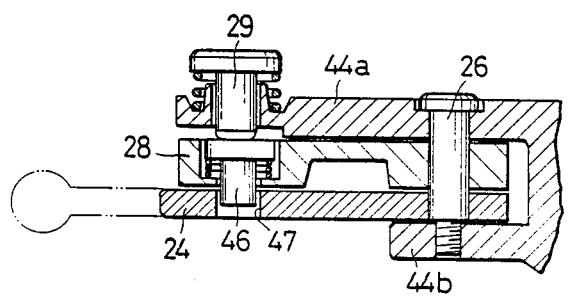
FIGS. 8, 9 and 10 are sectional views similar to FIG. 7, but illustrating the operation steps, respectively, of the reverse drive mechanism.
Figure 9:
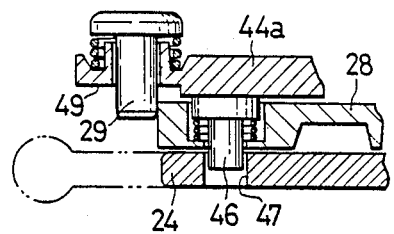

Upon depression of the switching button 29, the lock pin 46 is pushed down and engages with the engaging hole 47 as shown in FIG. 8. Therefore, when the clutch lever 24 is pulled while the switching button 29 is depressed, the switching link 28 and the clutch lever 24 are caused to swing about the hinge pin 26 so that both the clutch cable 27 and the switching cable 18 are pulled. As a result, the clutch is released and the shift lever 15 is caused to swing by the switching cable 18 so that the idle gear 11 is shifted to the reverse drive position. In this case, as shown in FIG. 9, the lock pin 46 rotated away from the stepped portion 49 so that its head is made into contact with the undersurface of the upper arm 44a and the lock pin 46 itself is engaged with the engaging hole 47. After the clutch lever 24 has been pulled, the driver releases it so that the side surface of the switching link 28 is pressed against the switching button 29 by the returning force acting through the clutch cable 27 and the switching cable 18. Because of the friction between the switching link 28 and the switching button 29, even when the switching button 29 is released, it remains in the projected position as shown in FIG. 9 so that clutch lever 24 is prevented from returning to its deactivated position. After the clutch lever 24 is maintained in the pulled position as described above, a reverse switch/speed control lever 31 is pushed so that the motorcycle starts reverse driving. In this case, depending upon the pressure applied to the lever 31, the reverse speed can be freely controlled.

Figure 10:
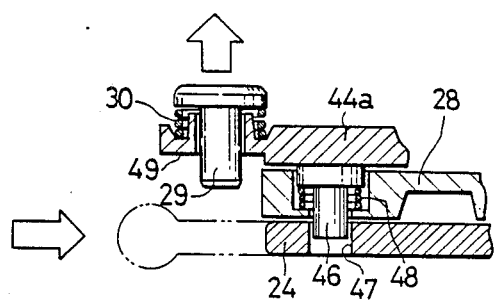

When the reverse drive is switched to the forward drive, the clutch lever 24 is further pulled from the position shown in FIG. 9 to that as shown in FIG. 10, the switching button 29 is moved away from the switching link 28 to the upper position under the force of the spring 30. Therefore, when the driver releases the clutch lever 24, it is rotated in unison with the switching link 28 about the hinge pin 26 to its normal position. When the lock pin 46 reaches the stepped portion 49, it is pushed upwardly under the force of the spring 48 so that it is disengaged from the engaging hole 47 and is returned to its normal position as shown in FIG. 7. As a result, the reverse drive connection between the starter motor 4 and the driving shaft 1 is disconnected so that when the transmission or the speed change gear is shifted in the forward drive position by means of a change pedal, the motorcycle is driven forwardly. As will be described in detail hereinafter, during the reverse drive, the speed change gear is maintained in the neutral position.

Figure 5:
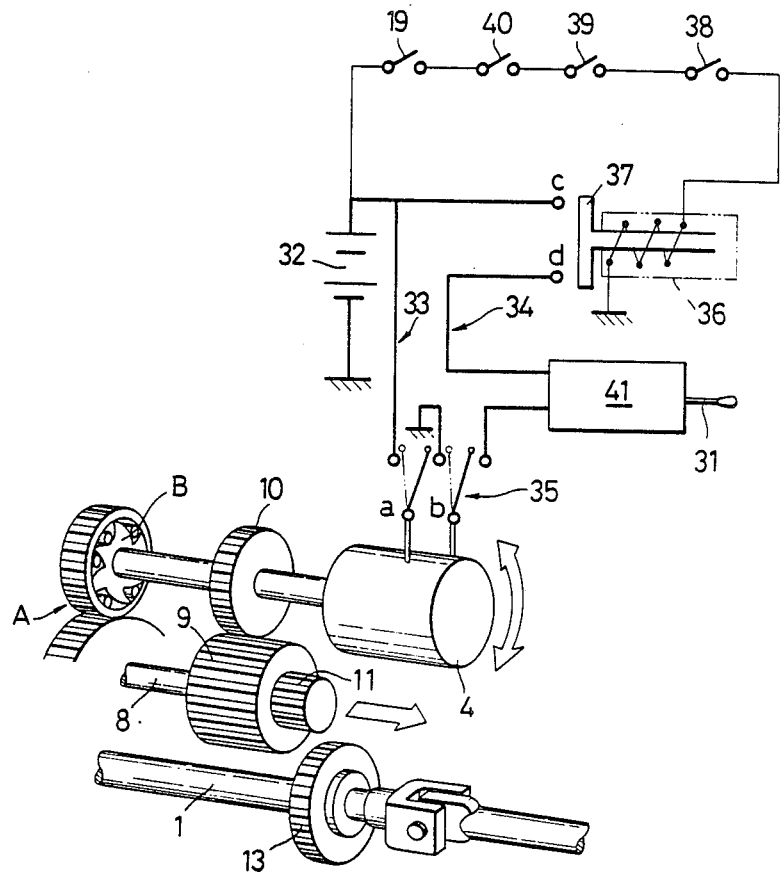
FIG. 5 is a starter motor drive control circuit.
Figure 6:
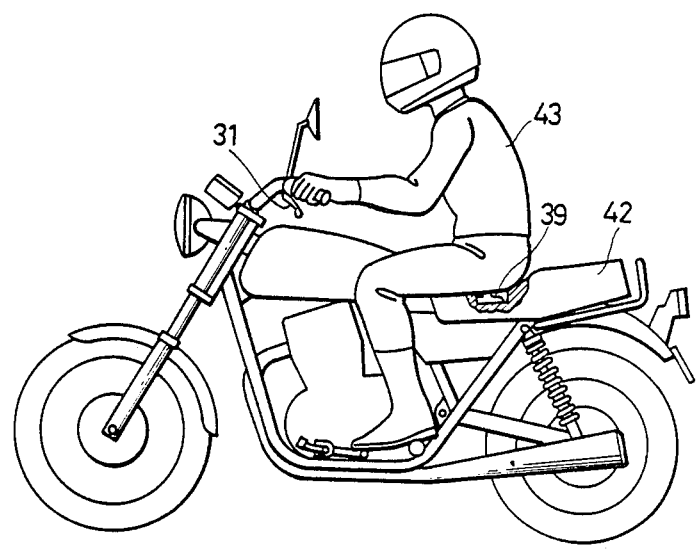
FIG. 6 is a schematic side view of a motorcycle to which is applied a reverse drive mechanism in accordance with the present invention.

FIG. 5 shows a drive control circuit for the starter motor 4 and schematically shows the mechanical component described above with reference to FIG. 1. The driving force is transmitted from the starter motor 4 to the crankshaft through a gear transmission device A and the rotating force of the driving shaft 1 is transmitted to the rear wheel through the shaft drive system. The circuit shown in FIG. 5 is provided a forward rotation circuit 33 and a reverse rotation circuit 34 both of which are connected to a battery 32. The starter motor 4 is connected to one of the feeder circuits by means of an actuating switch 35. As is clear from FIG. 5, when the starter motor 4 is connected to the forward rotation circuit 33, the current flows through the starter motor 4 from a terminal a to a terminal b so that the starter motor 4 is rotated in the clockwise direction. This rotation is transmitted through a one-way clutch B and the gear transmission device A to the crankshaft. On the other hand, when the starter motor 4 is connected to the reverse or counterclockwise circuit 34, the current flows from the terminal b to the terminal a so that the starter motor 4 is rotated in the counterclockwise direction. This rotation is transmitted through the gears 10, 9, 11 and 13 to the driving shaft 1. The counterclockwise rotation circuit 34 energizes a relay 36 so that its movable member 37 interconnects between terminals c and b. The relay 36 is energized when a stand switch 38, a seat switch 39, a neutral switch 40 and the reverse gear switch 19 are all turned on. The stand switch 38 is turned on when the stand which maintains the motorcycle in the upright position when it is in the rest state is moved upwardly, the seat switch 39 is turned on when the driver rides on the seat, and the neutral switch is turned on when the speed change gear or transmission is shifted to the neutral position. It follows therefore that unless the driver moves the stand upwardly, rides over the seat and shifts the speed change gear or transmission to the neutral position, the reverse drive cannot be made. Under these conditions, when the clutch lever 24 is pulled so that the idle gear 11 is shifted to the right reverse drive position as shown in FIG. 1 in the manner described above with reference to FIGS. 2-4, the reverse gear switch 19 is turned on in response to the rotation of the shift lever 15 so that the relay 36 is energized to close the counterclockwise direction circuit 34 is closed by the moving part 37 of the relay 36.

Since the driving force required for the reverse drive is a fraction of the driving force for starting the engine, it is satisfactorily possible to utilize the starter motor 4 for the reverse drive, but when the output from the starter motor 4 is directly used for the reverse drive, the reverse drive speed becomes too fast so that a chopper circuit 41 is inserted in the counterclockwise direction circuit 34 to intermittently flow the current through the starter motor 4, thereby rotating the starter motor 4 at a suitable rotational speed. The chopper circuit 41 also functions as a switch and when the reverse switch/speed control lever 31 connected to the chopper circuit 41 is actuated, the electric current flows into the starter motor 4 so as to energize it and concurrently the electric current fed into the starter motor 4 is so controlled as to vary the rotational speed of the starter motor 4; that is, the reverse drive speed.

Figure 11:
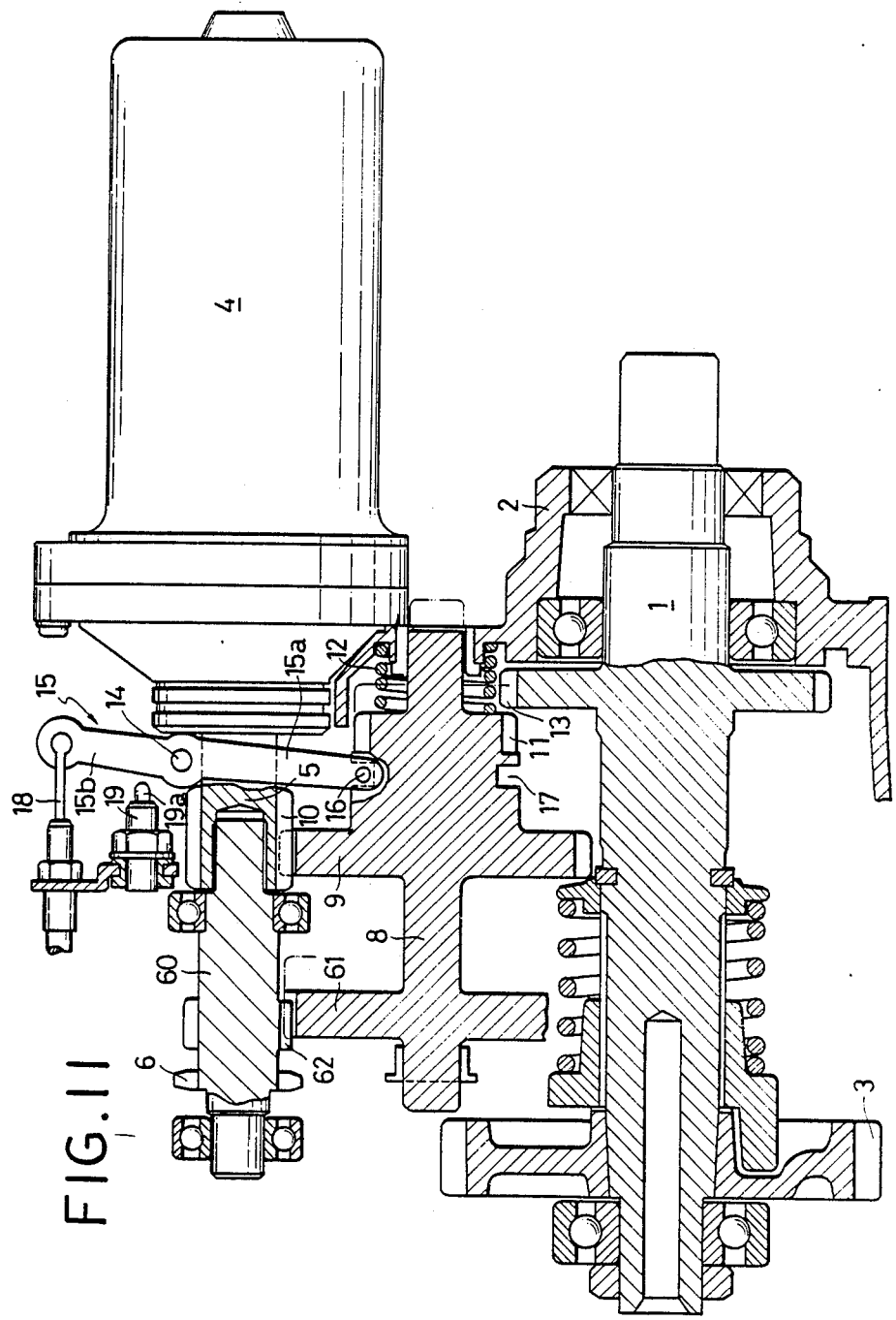
FIG. 11 is a sectional view of a second embodiment of the present invention illustrating the major component parts thereof.

Referring next to FIG. 11, a second embodiment of the present invention will be described.

In the first embodiment described above with reference to FIGS. 1-10, the sprocket 6 incorporating therein the one-way clutch is carried by the output shaft 5 of the starter motor 4, but in the second embodiment shown in FIG. 11, one end of a starter shaft 60 is rotatably fitted into the axial hole at the leading end of the output shaft 5 coaxially therewith and the sprocket 6 is carried integral with the starter shaft 60.

A gear 61 formed integral with the shift gear shaft 8 is in mesh with a gear 62 formed integral with the starter shaft 60.

In FIG. 11, in the case of pulling the shift cable 18 so as to shift the shift gear shaft 8 to the right so that the starter motor 4 is rotated in the counterclockwise direction to drive the motorcycle in the reverse direction, the gears 61 and 62 are disengaged from each other so that the rotating force in the counterclockwise direction is not transmitted from the starter motor 4 to the starter shaft 60.

Figure 12:
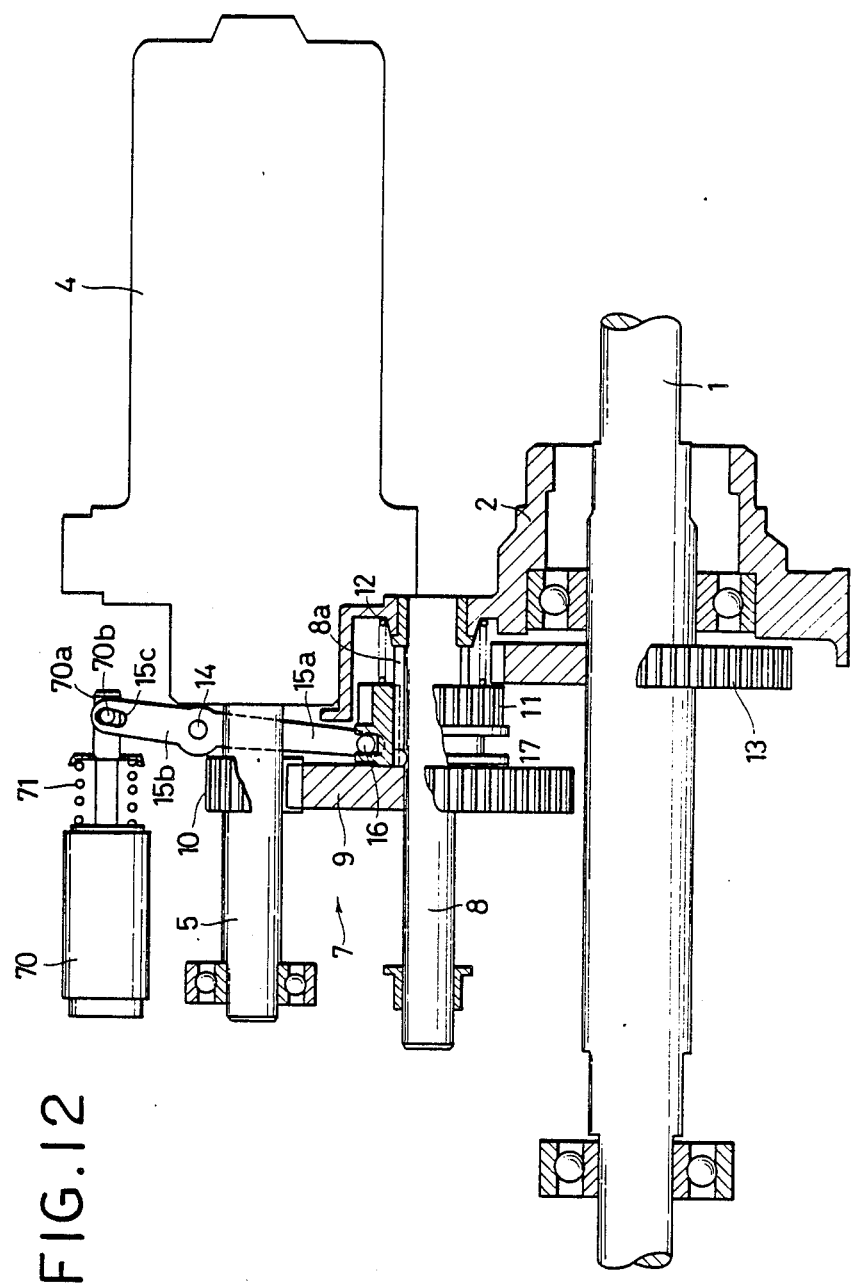
FIG. 12 is a view used to explain a third embodiment of the present invention.
Figure 13:
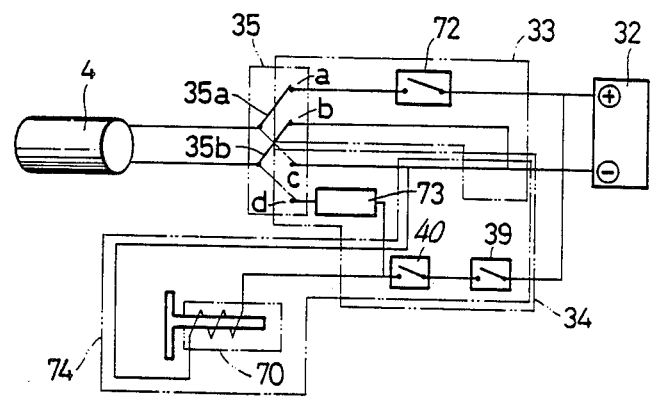
FIG. 13 is a circuit diagram of an electric current feeder.
Figure 14:
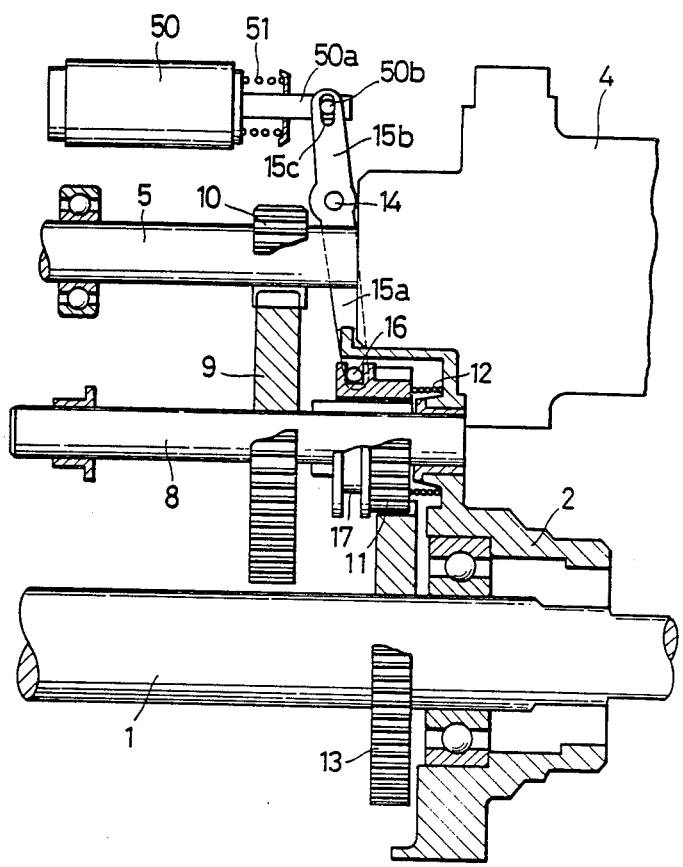
FIG. 14 is a view used to explain the mode of operation of the reverse drive mechanism of the third embodiment shown in FIG. 12.

Referring next to FIGS. 12-14, a third embodiment of the present invention will be described.

In the first or second embodiment shown in FIG. 1 or 11, the other arm 15b of the shift lever 15 for engaging and disengaging the gear 11 with and from the gear 13 is connected through the cable 18 to the reverse shift mechanism 20 and the shift lever 15 is caused to swing in response to the operation of the clutch lever 24 attached to the reverse shift mechanism 20. But, in the embodiment shown in FIGS. 12-14, and elongated hole 15c is formed at the upper end portion of the other arm 15b of the shift lever 15 and a pin 70b extended from the moving member 70a of a solenoid 70 is fitted into the elongated hole 15c. The member 70a is loaded with a return spring 71.

Referring next to FIG. 13, a starter motor circuit will be described.

A clockwise direction rotation circuit 33 and a counterclockwise direction rotation circuit 34 is selected by an actuating switch 35. Inserted into the clockwise direction rotation circuit 33 is a starter switch 72 which establishes or interrupts the electrical connection between the positive terminal (+) of the battery 32 and a contact of the actuating switch 35. A terminal b of the actuating switch 35 is connected to the negative terminal (—) of the battery 32.

In the counterclockwise direction rotation circuit 34, a terminal c of the actuating circuit 35 and the negative terminal (—) of the battery 32 is interconnected while a neutral switch 40 which is turned on when the speed change gear or transmission is in the neutral position and a seat switch 39 are connected in series between a terminal b of the actuating switch 35 and the positive terminal (+) of the battery 32.

One end of a solenoid feeder circuit 74 incorporating therein the solenoid 70 is connected to the joint between a current varying device 73 and the neutral switch 46 while the other end thereof is connected to the negative terminal (—) of the battery 32.

Next the mode of operation of the third embodiment with the above-described construction will be described. When the engine is started, the selection terminals 35a and 35b of the actuating switch 35 assume the positions indicated by the solid lines in FIG. 13; that is, they are connected to the terminals a and b of the actuating switch 35. Therefore the positive terminal (+) of the battery is connected through the starter switch 72 to the starter motor 4 and the selection contact 35a of the actuating switch 35 is connected through the terminal b to the negative terminal (—) of the battery 32. It follows therefore that when the starter switch 72 is closed, the starter motor 4 rotates in the clockwise direction. Therefore, the output shaft 5 and the gear 10 indicated in FIG. 12 rotates and the gear 9 in mesh with the gear 10 rotates. However, no current is supplied to the feeder circuit 74 for energizing the solenoid 70, the latter remains de-energized so that the moving member 70a, the shift lever 15 and the idle gear 11 drivingly coupled to the shift lever 15 remain in the positions indicated in FIG. 12. As a result, the rotation in the clockwise direction of the idle gear 11 and the gear 13 is not transmitted to the drive shaft 1 through the above-described reverse driving force transmission system.

The rotation in the clockwise direction of the starter motor 4 is transmitted through a starter pinion (not shown) to the gear train on the side of the crankshaft by the actuation of the starter clutch (not shown), whereby the engine is started.

In the case of the reverse drive, the actuating switch 35 is so actuated that its moving contacts 35a and 35b are disconnected from the terminals a and b and connected to the terminals c and d, respectively, of the counterclockwise direction rotation circuit. As a result, the current supplied from the battery 32 to the starter motor 4 is reversed in polarity. That is, the moving terminal 35b is connected to the positive terminal (+) of the battery 32 while the moving terminal 35b is connected to the negative terminal (—) thereof. In this case, the neutral switch 40 is so designed and constructed that it will not be actuated unless the speed change gear or transmission is in the neutral position. When the above-described conditions are satisfied, the neutral switch 40 is turned on so that the circuit for feeding the current to the starter motor 4 is established and concurrently the solenoid feeder circuit 74 is also established so that the solenoid 70 is energized. Then the moving member 70a of the solenoid 70 moves to the left in FIG. 12 against the biasing force of the spring 71 and the shift lever 15 rotates about the fixed shaft 14. As a result, the idle gear 11 is displaced along a projected guide 8a of the shift gear shaft 8 to the right in FIG. 12 and is engaged with the gear 13 as shown in FIG. 14.

When the starter motor 4 is energized under these conditions, it is rotated in the counterclockwise direction because the current supplied to the starter motor 4 is reversed in polarity as described above. Therefore, the output shaft 5 and the gear 10 are rotated in the direction opposite to the direction in which they are rotated when the engine is started and the gear 9 which is normally in mesh with the gear 10 is rotated and concurrently the shift gear shaft 8 and the idle gear 11 are rotated. The driving shaft 1 is rotated in the counterclockwise direction through the gear 13 in mesh with the idle gear 11.

In this case, the rotation in counterclockwise direction of the starter motor 4 is also transmitted to the starter clutch (not shown), but the latter is so designed and constructed that it engages with the clutch only in case of the clockwise direction. Thus, the rotation in the counterclockwise direction itself is not transmitted to the starter pinion and the gear train on the side of the crankshaft drivingly coupled to the starter pinion.

Figure 15:
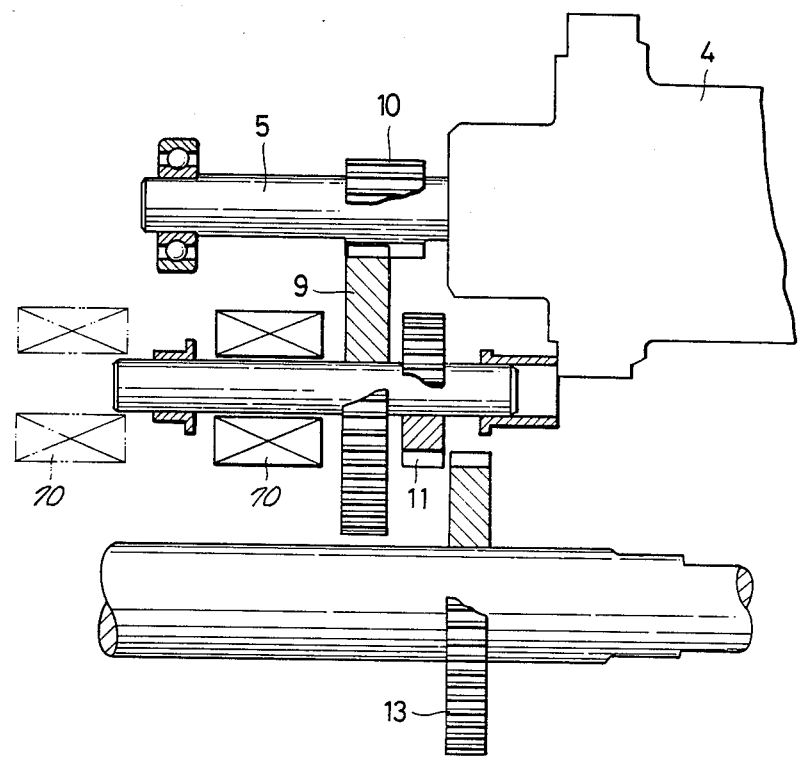
FIG. 15 is a view used to explain a fourth embodiment of a reverse drive mechanism in accordance with the present invention.
Figure 16:
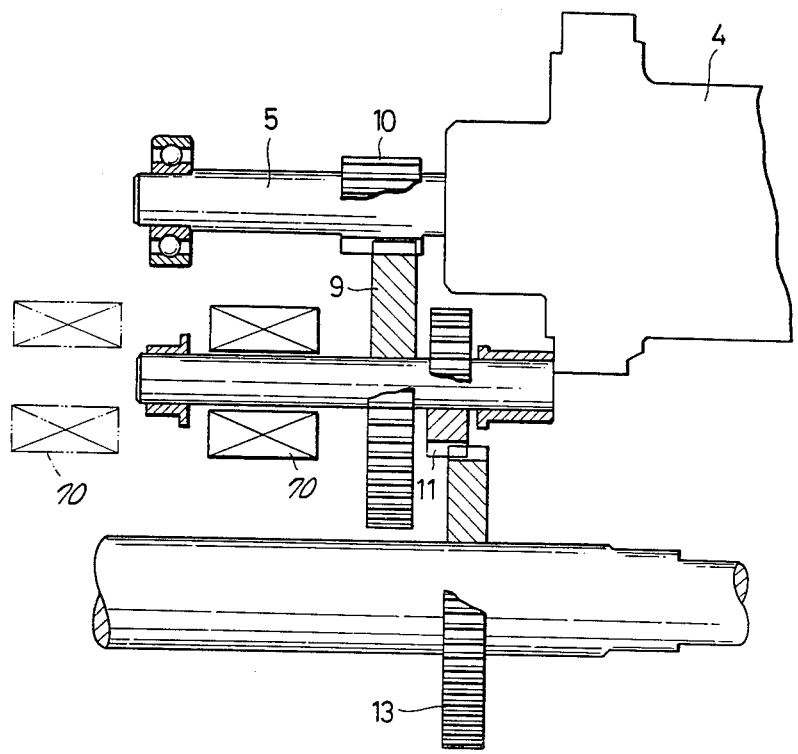
FIG. 16 is a view used to explain the mode of the operation of the reverse drive mechanism of the fourth embodiment shown in FIG. 15.

Referring next to FIGS. 15 and 16, a fourth embodiment of the present invention will be described. The gear 9 is securely fixed to the shift gear shaft 8 which is slidable in the axial direction and the solenoid 70 is disposed at the end of the shift gear shaft 8 or surrounds the end portion of the shaft 8 so that the shift gear shaft 8 can be utilized as the moving element of the solenoid 70, whereby the shift gear shaft 8 and the solenoid 70 constitute a solenoid clutch mechanism. In this case, the gear 10 has a width sufficient to always engage with the gear 9 even before and after the displacement of the shift gear shaft 8.

In the fourth embodiment, when the starter motor is rotating in the clockwise direction, the shift gear shaft 8 remains in the position indicated in FIG. 15 and the idle gear 11 is out of mesh with the gear 13. Therefore as in the case of the embodiment described above with reference to FIGS. 12-14, the rotation in the clockwise direction of the starter motor 4 is not transmitted to the drive shaft 1 through the reverse drive force transmission system.

On the other hand, when the starter motor 4 is rotating in the counterclockwise direction, the solenoid 70 is energized so that the shift gear shaft 8 is displaced to the right in FIG. 16 so that the idle gear 11 engages with the gear 13. Therefore the rotation in the counterclockwise direction of the starter motor 4 is transmitted to the drive shaft 1 through the reverse drive force transmission system.

In the fourth embodiment shown in FIGS. 15 and 16, the starter pinion and the starter clutch (not shown) carried by the output shaft 5 operate in a manner substantially similar to that described above with reference to FIGS. 12-14. That is, in case of the rotation in the clockwise direction of the starter motor 4, the rotation is transmitted to the gear train on the side of the crankshaft while in the case of the rotation in the counterclockwise direction, the rotation is cut off or not transmitted by means of the starter clutch.

Next referring to FIGS. 17-19, a fifth embodiment of the present invention will be described.

The drive shaft 1 carries a disk member 81 which has a U-shaped cross sectional configuration and which has a cylindrical inner peripheral surface 81a.

The drive shaft 1 further carries a one-way clutch 80 which permits or interrupts the transmission of the driving power transmitted through the idle gear 11 to the driving shaft 1. The one-way clutch 80 will be described in detail hereinafter. A gear 82 which is normally in mesh with the idle gear 11 is rotatably carried by a bearing 8b of the driving shaft 1 and has an extended portion 82a which is extended from one side of the gear 82 into the recess of the disk member 81 so as to surround the driving shaft 1. A ring-shaped inner retainer 83 is wrapped around the cylindrical side surface of the extended portion 82a in opposed relationship with the inner cylindrical surface 81a of the recess of the disk member 81 and a ring-shaped outer retainer 84 is disposed around the inner retainer 83 in opposed relationship with the inner cylindrical surface 81a of the recess of the disk member 81. A spacer 85 is interposed between the inner and outer retainers 84 and 85 so that they can be rotated independently of each other without making direct contact with each other.

A plurality of pins 86 and 87 are extended from one surface of the inner and outer retainers 83 and 84 into the recess of the disk member 81 and one pin 86 and one pin 87 are paired. Each clutch shoe 88 is supported by a pin pair. More particularly, one end of the clutch shoe 88 is rotatably supported by the pin 86 while an elongated hole 88a formed at the other end portion of the clutch shoe 88 is fitted with the pin 87 extended from the outer retainer 87.

Figure 18:
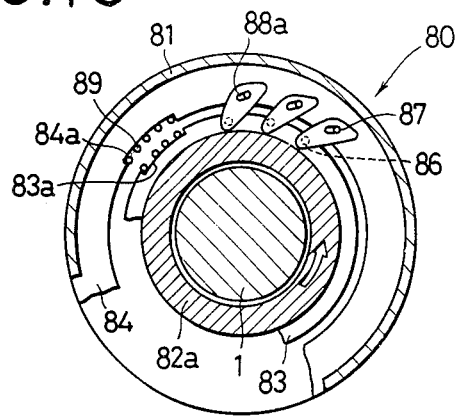
FIG. 18 is a view used to explain the mode of operation of a one-way clutch thereof when an engine is started.

As shown in FIG. 18, a groove 83a is formed around the cylindrical outer face of the inner retainer 83 and a groove 84a is formed around the cylindrical inner surface of the outer retainer 84 in such a manner that their positions coincide with each other in the initial state. A compression coil 89 for energizing the inner and outer retainers 83 and 84 in their directions of rotation is disposed in the space defined by the grooves 83a and 84a.

Next the mode of operation of the fifth embodiment with the above-described construction will be described. First in the case of starting the engine, the contact selectors 35a and 35b of the actuating switch 35 remain in the positions indicated by the solid lines in FIG. 17 and therefore are kept in contact with the terminals a and b. Then the positive terminal (+) of the battery 32 is connected through a starter switch 72 to the starter motor 4 while the negative terminal (−) of the battery 32 is connected through the terminal b and the contact selector 35 of the actuating switch 35 to the starter motor 4. Therefore when the starter switch 72 is closed, the starter motor 4 is energized to rotate in the clockwise direction so that the output shaft 5 and the gear 10 shown in FIG. 17 are rotated, whereby the gear which is normally in mesh with the gear 10 and the idle gear 11 coaxially carried with the gear 9 are rotated.

When the idle gear 11 is rotated so that a gear 82 in mesh therewith is rotated, the inner retainer 83 fitted over the extended surface 82a of the gear 82 is rotated. In this case, the extended portion 83a is rotated in the direction indicated by an arrow in FIG. 18 and the inner retainer 83 is also rotated in the same direction. In this case, one end of the inner retainer 83 fixed with the pin 86 is pulled in the direction of rotation of the inner retainer 83 so the pin 87 on the side of the outer retainer 84 is brought to the uppermost position in the elongated hole 88a. As a result, the outer retainer 84 is pulled by the clutch shoe 88 to rotate in the same direction with the inner and outer retainers 83 and 84 remain in the initial state as shown in FIG. 18.

In the case of the rotation in the clockwise direction described above, the top of the clutch shoe 88 is spaced apart from the inner cylindrical surface 81a of the disk member 81 so that the one-way clutch 80 is "disengaged" so that the rotation of the gear 82 is not transmitted to the drive shaft 1. That is the rotation in the clockwise direction of the starter motor 4 is not transmitted to the drive shaft 1 throughout the reverse drive power transmission system.

Then the rotation in the clockwise direction of the starter motor 4 is transmitted through the starter pinion (not shown) to the gear train on the side of the crankshaft by the above-described starter clutch (not shown), whereby the engine is started.

In the case of reverse drive, the actuating switch 35 is so actuated that their contact selectors 35a and 35b are moved away from the terminals a and b and made into contact with the terminals c and d, respectively. Then the current supplied from the battery 32 to the starter motor 4 is reversed in polarity. That is, the contact selector 35b is connected to the positive (+) terminal of the battery 32 while the contact selector 35a is connected to the negative (−) terminal thereof. The neutral switch 40 is so designed and constructed that it is not actuated unless the transmission is shifted into the neutral position and when the above-described conditions are satisfied, it is turned on, whereby the feeder circuit to the starter motor 4 is established.

When the starter motor 4 is started under these conditions, it rotates in the counterclockwise direction and the current supplied thereto is reversed in polarity as described above. Therefore, the output shaft 5 and the gear shown in FIG. 17 are rotated in the direction opposite to the direction in which they are rotated when the engine is started so that the gear 9 which is normally in mesh with the gear 10 and the idle gear 11 carried coaxially with the gear 9 are also rotated in the counterclockwise direction.

When the idle gear 11 is rotated so that the gear 82 in mesh therewith is rotated, the inner retainer 83 fitted around the extended portion 82a of the gear 82 is also rotated. In this case, the extended portion 82a is rotated in the direction indicated by an arrow in FIG. 19 and the inner retainer 83 is rotated also in the same direction. In this case, one end of the clutch shoe 88 pivoted with the pin 86 is pushed into the direction of the rotation of the inner retainer 83 and due to the inertia produced between the inner and outer retainers 83 and 84 by the rotation of the inner retainer 83a a compression coil 85 arranged between grooves and 84b is compressed. As a result, the inner retainer 83 is located at a position slightly forwardly of the outer retainer 84 as shown in FIG. 19.

Figure 19:
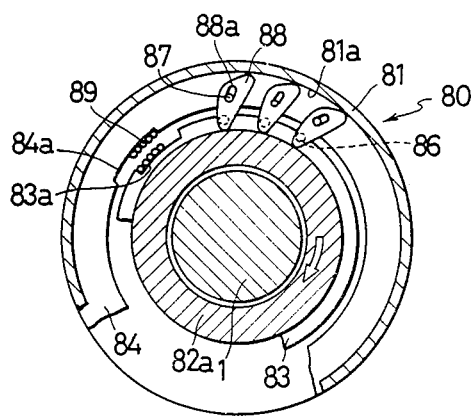
FIG. 19 shows the reverse drive mode thereof.

As described above, in the case of the rotation in the counterclockwise direction, a shown in FIG. 19, one end of the clutch shoe 88 pivoted with the pin 86 is pushed in the direction of rotation and the inner retainer 83 is located at a position slightly forwardly of the outer retainer 84 so that the clutch shoe 88 is raised and consequently the pin 87 extended from the outer retainer 84 is shifted to the lowermost position in the elongated slot 88a. As a result, the top of the clutch shoe 88 is made into contact with the inner cylindrical surface 81a of the disk member 81 so that the one-way clutch 80 is "disengaged". Then the rotation of the gear 82 is transmitted to the drive shaft 1. That is, the rotation in the counterclockwise direction of the starter motor 4 is transmitted through the reverse drive power transmission system X to the drive shaft 1.

In this case, the rotation in the counterclockwise direction of the output shaft 5 is also transmitted to the abovedescribed starter clutch (not shown), but the starter clutch is engaged only in the case of the rotation in the clockwise direction so that the rotation in the counterclockwise direction is not transmitted to the starter pinion and the gear train on the side of the crankshaft drivingly coupled therewith.

When the motorcycle is driven in reverse by a desired distance, the feed of electricity to the starter motor 4 is interrupted by, for instance, gradually dropping the voltage supplied to the starter motor 4 by the above-described current varying device 73 and then the motorcycle is completely stopped by applying brake. In this case, under the force of the compressed compression coil 89, the inner retainer 83 is so biased to rotate in the counterclockwise direction while the outer retainer 84 is so biased to rotate in the clockwise direction in FIG. 19. Therefore when the rotation of the driving shaft 1 is stopped, the inner retainer 83 which has been located at a position slightly forwardly of the outer retainer 84 during the reverse drive is forced to return to its initial position indicated in FIG. 18 under the force of the compression spring 89 so that the top of the clutch shoe 88 is moved away from the inner cylindrical surface 81a of the disk member 81 and consequently the one-way clutch is "disengaged". As is apparent from the above description, the one-way clutch will not be driven into the "engagement mode" unless the starter motor 4 is driven in the counterclockwise direction.

Figure 20:
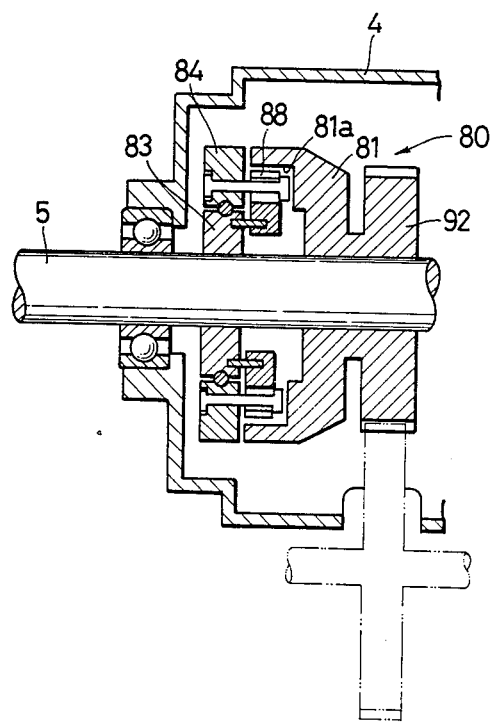
FIG. 20 is a sectional view illustrating major component parts of the driving power transmission system of the reverse drive mechanism in embodiment of the present invention.

Referring next to FIGS. 20, a sixth embodiment of the present invention will be described below. Same reference numerals are used to designate similar parts both in the fifth and sixth embodiments. In the sixth embodiment, the one-way clutch 80 is incorporated into the starter motor 4. More particularly, the inner retainer 83 described above in the fifth embodiment is securely fixed to the output shaft 5 and the disk member 81 is rotatably carried by the output shaft 5 so that the position of the disk member 81 in relation to the shaft 5 is not fixed. In addition, a reverse drive power transmission gear 92 is formed integral with the disk member 81.

Therefore, according to the sixth embodiment, in the case of the rotation in the clockwise direction of the starter motor 4, the top of the clutch shoe 88 is out of contact with the inner cylindrical surface 81a of the disk member 81 as in the case shown in FIG. 18 so that the disk member 81 and the gear 92 integral therewith are not rotated and consequently the rotation in the clockwise direction of the starter motor 4 is not transmitted. On the other hand in the case of the rotation in the counterclockwise direction of the starter motor 4, the clutch shoe 88 is raised so that its top is made into contact with the inner cylindrical surface 81a of the disk member 81 as in the case shown in FIG. 19. As a result, the disk member 81 and the gear 92 direction of the starter motor 4 is transmitted to the driving shaft 1 through a suitable reverse drive power transmission gear train such as the gears described above in the fifth embodiment.

In the above-described fifth and sixth embodiments, the following modification of means for "disengaging" the one-way clutch 80 after the reverse drive will be described below.

First, it is proposed to a torsion coil 91 between the inner and outer retainers 82 and 84 as shown in FIGS. 21(a)-(c). More particularly, the bend portion of the torsion coil 91 is securely attached to a supporting projection 90 extended from one side surface of the outer retainer 84 and one end of the torsion coil 91 is securely fixed to the inner retainer 83 while the other end thereof, to the outer retainer 84. Then, the torsion coil 91 biases the inner retainer 83 to normally rotate in the counterclockwise direction and also biases the outer retainer 84 to normally rotate in the clockwise direction as shown in FIG. 21(b).

When the starter motor 4 is rotated in the clockwise direction, the initial state as shown in FIG. 21 is maintained because of the operation described in detail in the fifth embodiment with reference to FIG. 18 so that the top of the clutch shoe 88 is out of contact from the inner cylindrical surface of the disk member 81 and consequently the one-way clutch 80 remains in the "disengagement" state.

On the other hand, when the starter motor 4 is rotated in the counterclockwise direction, the inner retainer 83 is shifted to a position slightly forwardly of the outer retainer 84 as shown in FIG. 21(c) while the torsion coil 91 is deformed to store the elastic returning energy. And by the operation described in detail in the fifth embodiment with reference to FIG. 19, the top of the clutch shoe 88 is made into contact with the inner cylindrical surface 81a of the disk member 81 so that the one-way clutch 80 is driven into the "engagement" state.

When the rotation of the starter motor 4 is stopped, the relative position between the inner and outer retainers 83 and 84 is returned to the initial state as shown in FIG. 21(b) under the elastic returning energy released from the torsion spring so that the clutch shoe 88 is moved away from the inner cylindrical surface 81a of the disk member 81 and the one-way clutch 80 is driven into the "disengagement" state.

A second proposal or modification is to provide a ring-shaped coiled spring 93 for normally biasing the clutch shoe 88 radially inwardly toward the center as shown in FIGS. 21(a)-(c). That is, coil pins are extended from one side of respective clutch shoes 88 and the ring-shaped coiled spring 93 is made into engagement with all the pins 94. Therefore, the clutch shoe 88 can be always maintained at the position shown in FIG. 22(b).

When the starter motor 4 is rotated in the clockwise direction, the initial state as shown in FIG. 22(b) is maintained by the operation described above in detail in the fifth embodiment with reference to FIG. 18 so that the top of the clutch shoe 88 is spaced apart from the inner cylindrical surface 81a of the disk member 81 and consequently the one-way clutch 80 is maintained in the "disengagement" state.

On the other hand, when the starter motor 4 is rotated in the counterclockwise direction, the inner retainer 83 is shifted to a position slightly forwardly of the outer retainer 4 as shown in FIG. 22(c) so that the coiled spring 93 is forced to expand radially outwardly by the coil pins 94 as shown and the top of the clutch shoe 88 is made into contact with the inner cylindrical surface 81a of the disk member 81 by the operation described above in detail in the fifth embodiment with reference to FIG. 19 and consequently the one-way clutch 80 is driven into the "engagement" state.

When the starter motor 4 is stopped, the elastic returning force of the coiled spring 93 acts on the coil pins 94 so that the clutch shoe 88 is pulled radially inwardly toward the center. As a result, the relative position between the inner and outer retainers 83 and 84 is returned to the initial position as shown in FIG. 22(b) so that the clutch shoe 88 is made out to contact with the inner cylindrical surface 81a of the disk member 81 and consequently the one-way clutch 80 is driven into the "disengagement" state.

Figure 17:
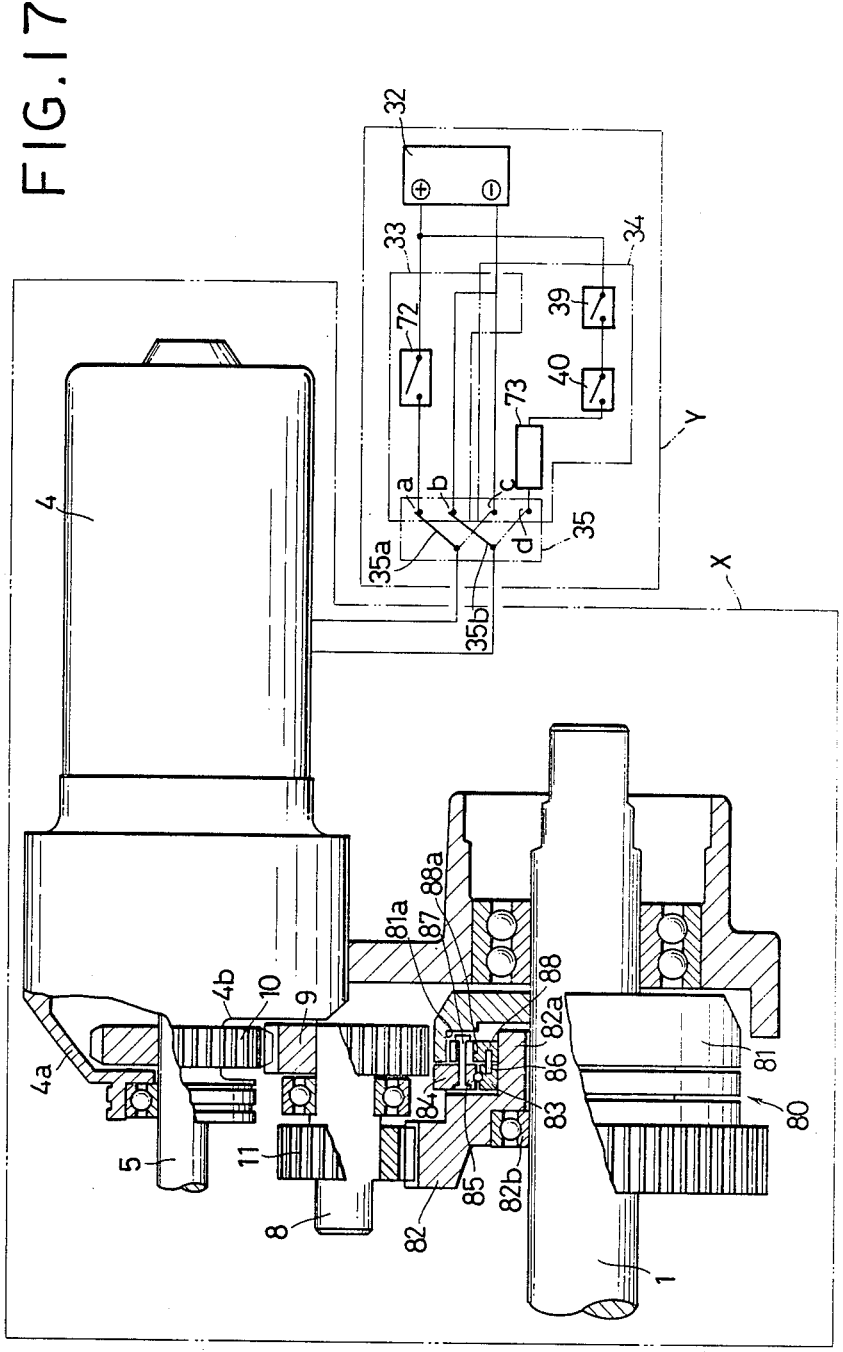
FIG. 17 is a top view, partially in section, of a fifth embodiment of the reverse drive mechanism in accordance with the present invention.

In the electric current feeder portion Y of the fifth embodiment, the seat switch 39 which is turned on when the driver rides over the seat can be connected in series to the mission switch 40 as shown in FIG. 17 so that the reverse drive mechanism can be actuated only when the driver 43 rides over the seat 42, (see FIG. 6) whereby safety can be much improved.

Figure 23:
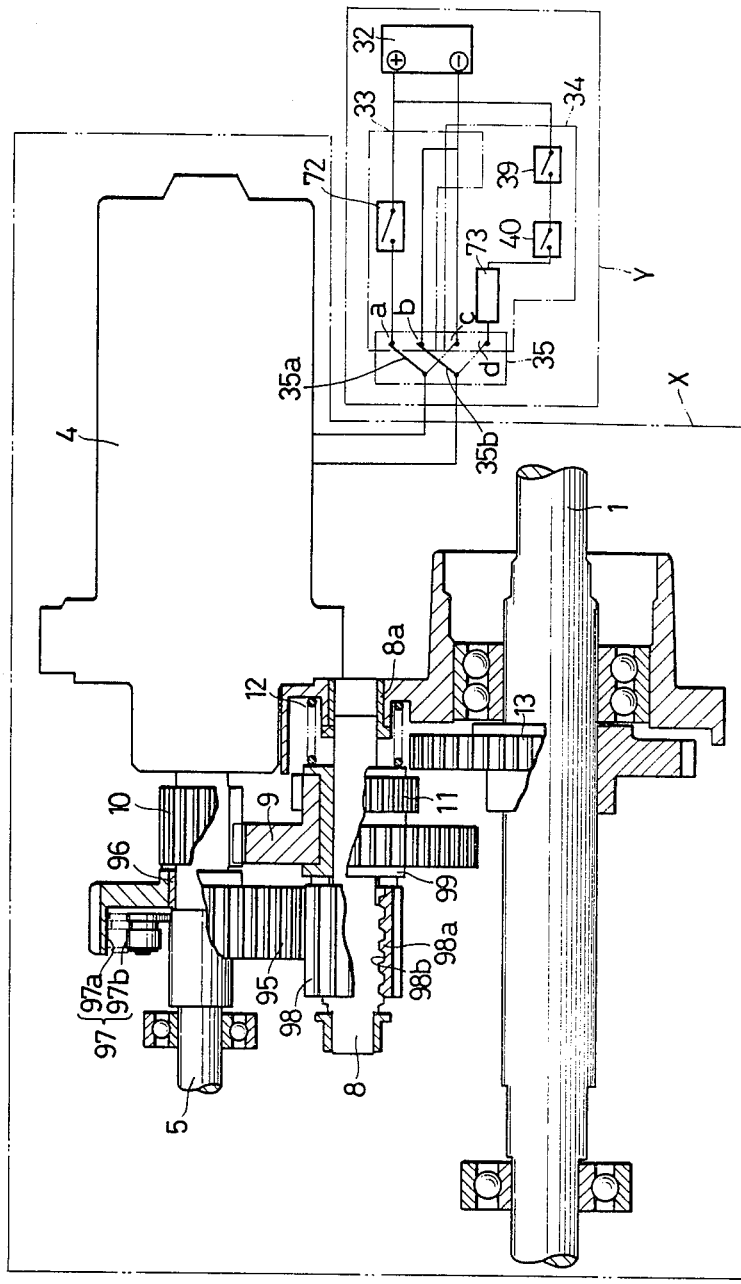
FIG. 23 is a view used to explain a seventh embodiment of a reverse drive mechanism in accordance with the present invention.
Figure 24:
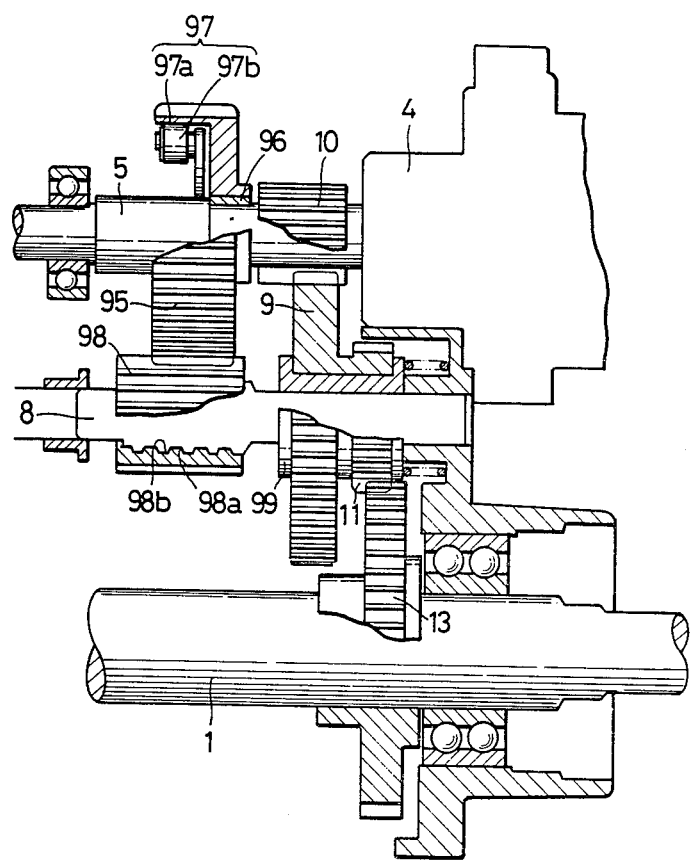
FIG. 24 is a view used to explain the mode of operation thereof.

Referring next to FIGS. 23 and 24, a seventh embodiment of the present invention will be described below. The output shaft 5 carries the gear 10 and also a gear 95 through a ring member 96 in such a way that the gear 95 is rotatable. One side surface of the gear 95 is recessed to define an inner cylindrical surface 97a. Within the recess of the gear 95, a weight shoe 97b is carried by the output shaft 5 in such a way that the weight shoe 97b can swing out of the recess only when the output shaft 5 is rotated in the direction (to be referred to as the reverse direction: hereinafter in this specification) opposite to the direction of rotation in which the output shaft 5 starts the engine. The inner cylindrical surface 97a and the weight shoe 97b constitute a one-way clutch in a clutch mechanism. Furthermore, the output shaft 5 carries a starter pinion (not shown) which transmits the rotation in the direction (to be referred to as "the forward direction" in this specification hereinafter) of the output shaft 5 for starting the engine.

A cylindrical gear 98 having internally threaded screws 98a is threadably engaged with the screw threads 98b of the shift gear shaft 8 in such a way that the cylindrical gear 98 is normally maintained in mesh with the gear 95 and upon rotation of the gear 98, the shift gear shaft 8 is shifted in the axial direction, thereby constituting a lead-screw drive. A flange ring member 99 is fitted over the shift gear shaft 8 and rotatably carries the gear 9 which is normally maintained in mesh with the gear 10 and the gear 11 formed integral with the gear 9 so that the gears 9 and 11 can rotate independently of the rotation of the shift gear shaft 8. Furthermore, a spring 12 is interposed between the bearing 8a and the flange ring member 99 so that the shift gear shaft 8 is normally based to the left in FIG. 23.

The driving shaft 1 carries the gear 13 which is adapted to engage with the gear 11 when the shift gear shaft 8 is displaced in the axial direction. In view of the above, the axial length of the gear 98 is so selected that even after the shift of the shift gear shaft 8, the gear 98 maintains the engagement with the gear 95.

Next the mode of operation of the seventh embodiment with above-described construction will be described below.

In the case of starting the engine, the contact selectors 35a and 35b of the actuating switch 35 are switched to make contact with the terminals a and b, respectively, as indicated in the solid lines in FIG. 23 so that the positive terminal (+) of the battery 32 is connected through the starter switch 72 to the motor 4 while the negative terminal (−) of the battery is connected through the terminal b and the contact selector 41b to the starter motor 4. Therefore, when the starter switch 72 is turned on, the starter motor 4 is rotated in the forward direction so that the output shaft 5 and gear 10 shown in FIG. 23 are rotated and consequently the gear 9 which is normally in mesh with the gear 10 and the gear 11 formed integral with the gear 9 are also rotated. Upon rotation of the output shaft 5, the weight shoe 97b of the one-way clutch 97 is rotated. In this case, since the output shaft 5 is rotated in the forward direction, the weight shoe 97b is not swung outwardly and is held in the position indicated by the solid line in FIG. 23 so that the one-way clutch 97 is in the "disengagement" state. As a result, gear 95 is not rotated so that the gear 98 normally in mesh therewith is also not rotated. Since the screw threads 98b of the gear 98 are threadably engaged with the screw threads 98a of the shift gear shaft 8, the shaft is not displaced in the axial direction and remains in the position indicated in FIG. 23. As a consequence the gear 11 is out of mesh with the gear 13 so that the rotation in the forward direction of the starter motor 4 is not transmitted to the drive shaft 1 through the reverse drive transmission X.

The rotation in the forward direction of the starter motor 4 is transmitted through the starter pinion (not shown) to the gear train on the side of the crankshaft whereby the engine is started.

In the case of the reverse drive, the actuating switch 35 is so actuated that its contact selectors 35a and 35b make contact with the terminal c and the terminal d, respectively, as indicated by the chain lines in FIG. 23. then the electric current supplied to the starter motor 4 from the battery 32 is reversed in polarity. That is, the contact selector 41b is connected to the positive terminal (+) of the battery 38 while the contact selector 35a, to the negative terminal (−) thereof. As described above, the neutral switch 40 is so designed and constructed that it is not actuated unless the speed change gear or transmission is in its neutral position. When the above-described conditions are met, the neutral switch 46 is turned on so that the feeder circuit to the starter motor 4 is established.

When the starter motor 4 is energized under these conditions, it rotates in the reverse direction because the electric current supplied thereto is reversed in polarity as described above. As a result, the output shaft 5 and the gear 10 shown in FIG. 23 are rotated in the direction opposite to the direction in which the engine is started and the gear 9 which is normally in mesh with the gear 10 and the gear 11 formed integral with the gear 9 are also rotated in the reverse direction. Upon rotation of the output shaft 5, the weight shoe 97b of the one-way clutch 97 is rotated. In this case, since the output shaft 5 is rotated in the reverse direction, the weight shoe 97b is swung outwardly and is maintained in a position indicated in FIG. 24 so that the one-way clutch 97 is driven into the "engagement" state. Then the gear 95 is rotated and the gear 98 normally in mesh therewith is also rotated so that because of the engagement of the screw threads 98a of the gear 98 with the screw threads 98b of the shift gear shaft 8, the shift gear shaft 8 is advanced to the right to a position indicated in FIG. 24. As a result, the gear 11 engages with the gear 13 so that the rotation of the starter motor 4 is transmitted through the output shaft 5 and the gears 10, 9, 11 and 13 to the drive shaft 1.

In this case, the rotation in reverse direction of the output shaft 5 is also transmitted to the starter clutch (not shown), but the starter clutch engages only when the starter motor is rotated in the forward direction so that the rotation in the reverse direction is not transmitted to the starter pinion and the gear train drivingly coupled therewith.

Figure 25:
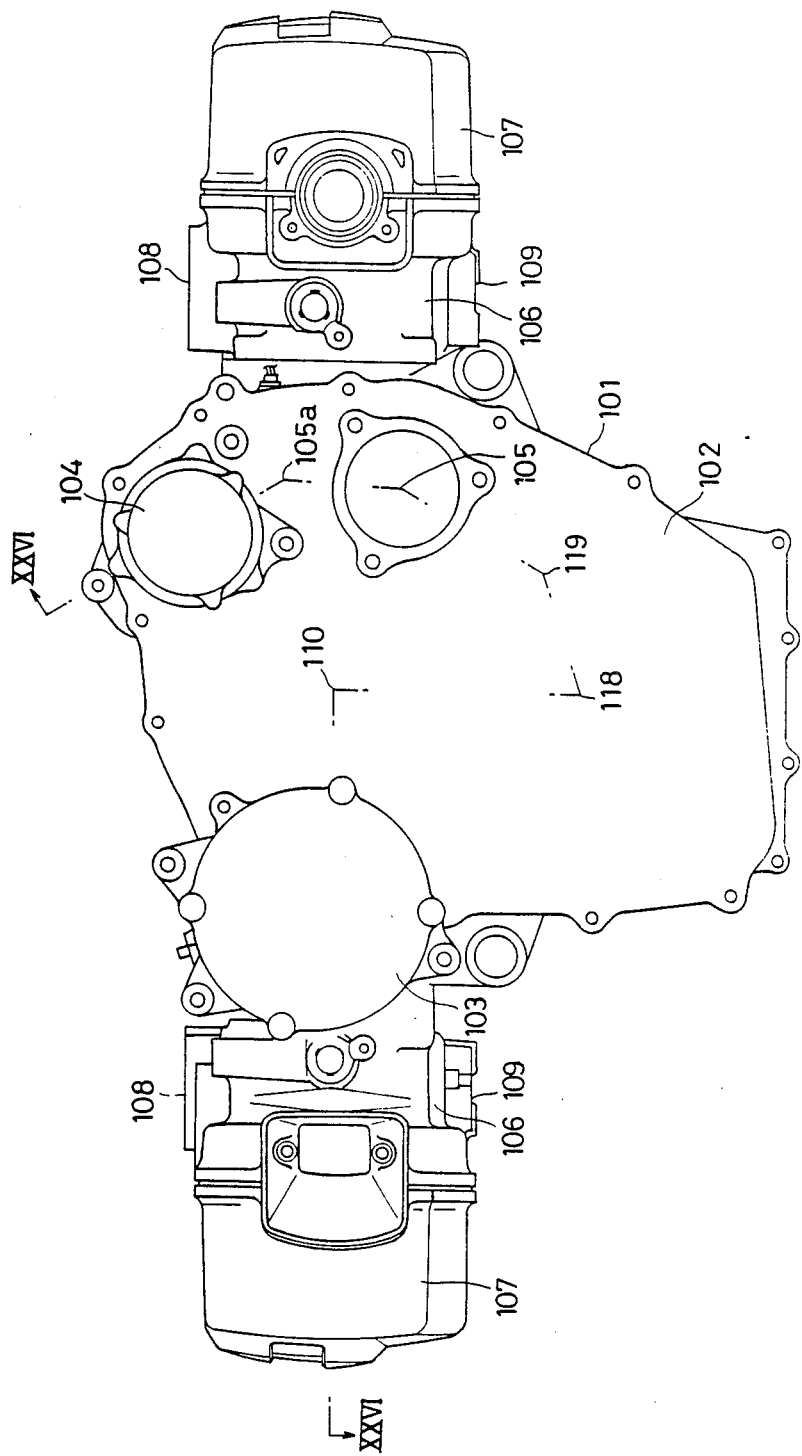
FIG. 25 is a rear view of a power unit housing of an eighth embodiment of the present invention.
Figure 26:
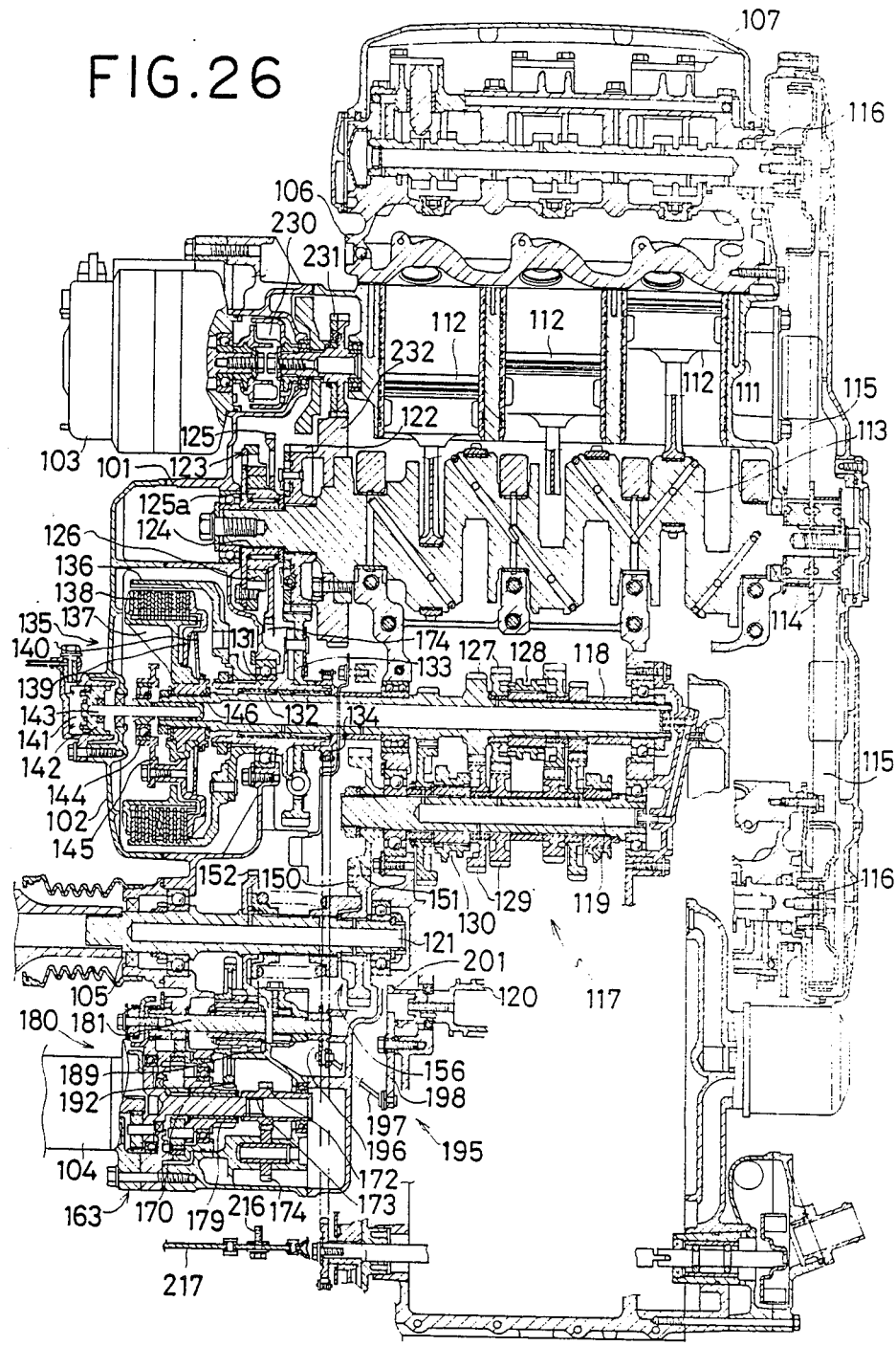
FIG. 26 is a longitudinal sectional view taken along the line XXVI—XXVI of FIG. 25.

Next referring to FIGS. 25-36, an eighth embodiment of the present invention will be described. FIGS. 25 and 26 show a power unit comprising an opposed-cylinder type engine with six cylinders and a transmission. FIG. 25 is a schematic rear view thereof while FIG. 26 is a sectional view taken along the line XXVI--XXVI of FIG. 25.

In FIG. 25, a housing 101 of the power unit, a clutch cover 102, an AC generator 103, a starter motor 104, an output shaft mounting hole 105, a center point 105a of reverse shaft, cylinder heads 106 and cylinder covers 107 connected respectively on both ends of said housing 101, inlet ports 108 of cylinder heads 106, outlet ports 109 and a center point 110 of a crankshaft are shown.

As shown in FIG. 26, a cylinder block 111 on one side has mounted therein three pistons 112, which are connected to the crankshaft 113. Two pulleys 114 drive camshafts 116 on both sides through timing belt 115.

Similarly to the heretofore known apparatus, a housing 101 supports a main shaft 118, a counter shaft 119, a shift drum 120 and an output shaft 121 of the transmission gear box 117. These shafts are respectively parallel to the crankshaft 113. The crankshaft 113 has fixed thereto on its left end an output gear 122 and a boss 124 of a one-way clutch 123 for starting use. The boss 124 carries loosely thereon a sleeve 125a which is integral with a starting input gear 125. A one-way transmission element 126 is interposed between a ring integral with the boss 124 and the sleeve 125a, thereby to drive the crankshaft 113 through the input gear 125, the transmission element 126 and the boss 124 on starting. After starting, the starting input gear 125 stops, but the crankshaft 113 continues to rotate due to the one-way clutch 123.

Similarly to the known apparatus, the main shaft 118 of the transmission gear box 117 is provided with reduction gears 127 and a clutch 128, and a counter shaft 119 is provided also with reduction gears 129 and a clutch 130. The main shaft 118 carries rotatably on its left end a clutch input sleeve 131 by means of a needle bearing 132. The clutch input sleeve 131 has fixed thereon a clutch input gear 133 and a sprocket 134 for driving the oil pump as well as an input element 136 of a main clutch 135.

The main clutch 135 consists of a number of friction plates 138 engaged with any one of the input element 136 and the output element 137. These plates 138 are arranged alternatively and pressed by a pressing plate 139 and a cup washer 140, in order to normally transmit the rotation transmitted from the gears 122, 133 and the sleeve 131 to the main shaft 118.

The clutch cover 102 is provided with a hydraulic cylinder 141 in order to press a piston 142, a rod 143, a bearing 144 and a release plate 145 to the right-hand side. By feeding hydraulic pressure, the pressure plate 139 is caused to shift rightward to release the pressure of the friction plate 138. The output element 137 is fixed to the main shaft 118 by means of a boss 146.

Figures 27, 27A:
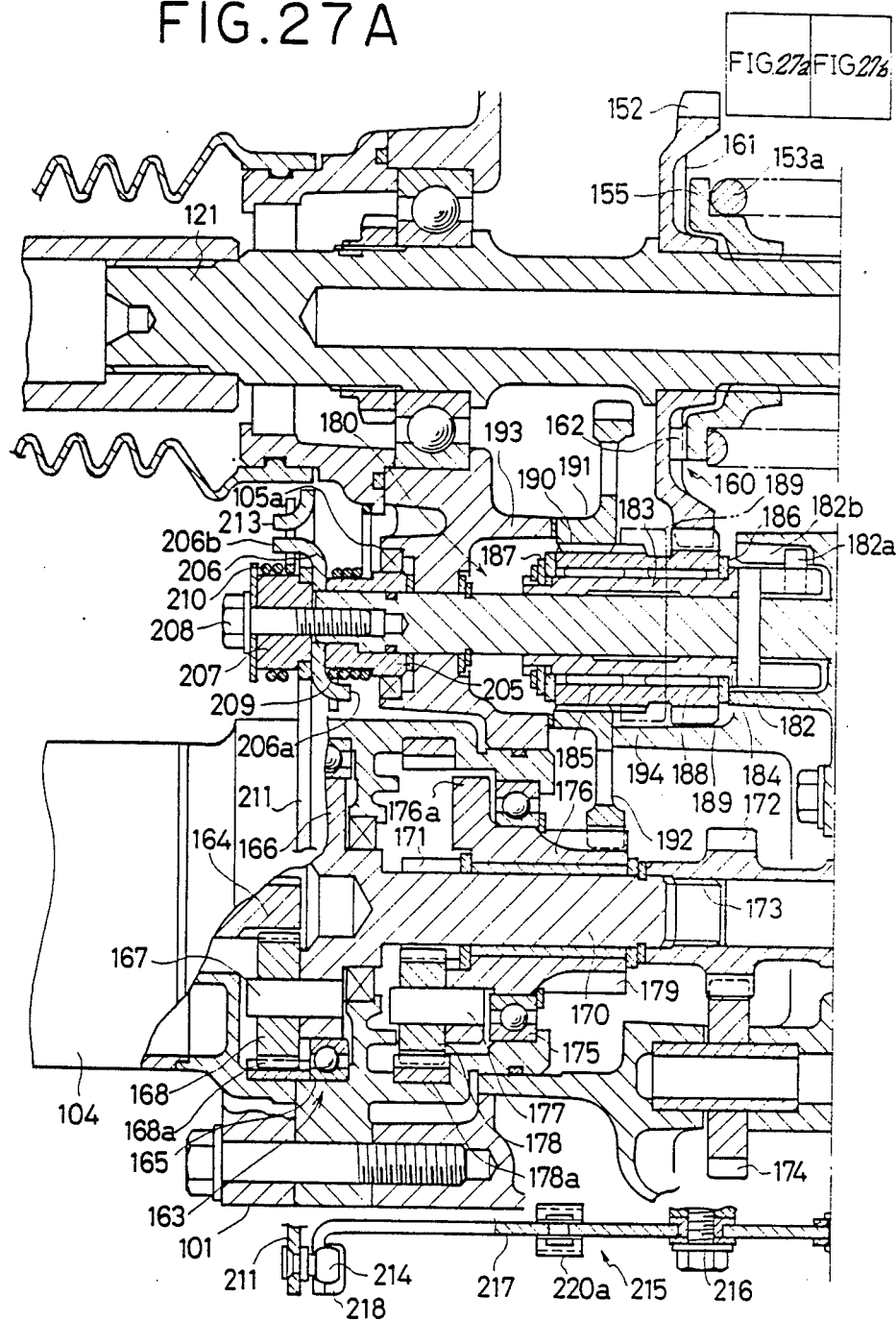
FIGS. 27, 27A, and 27B are enlarged views of a reverse drive mechanism.
Figure 27B:
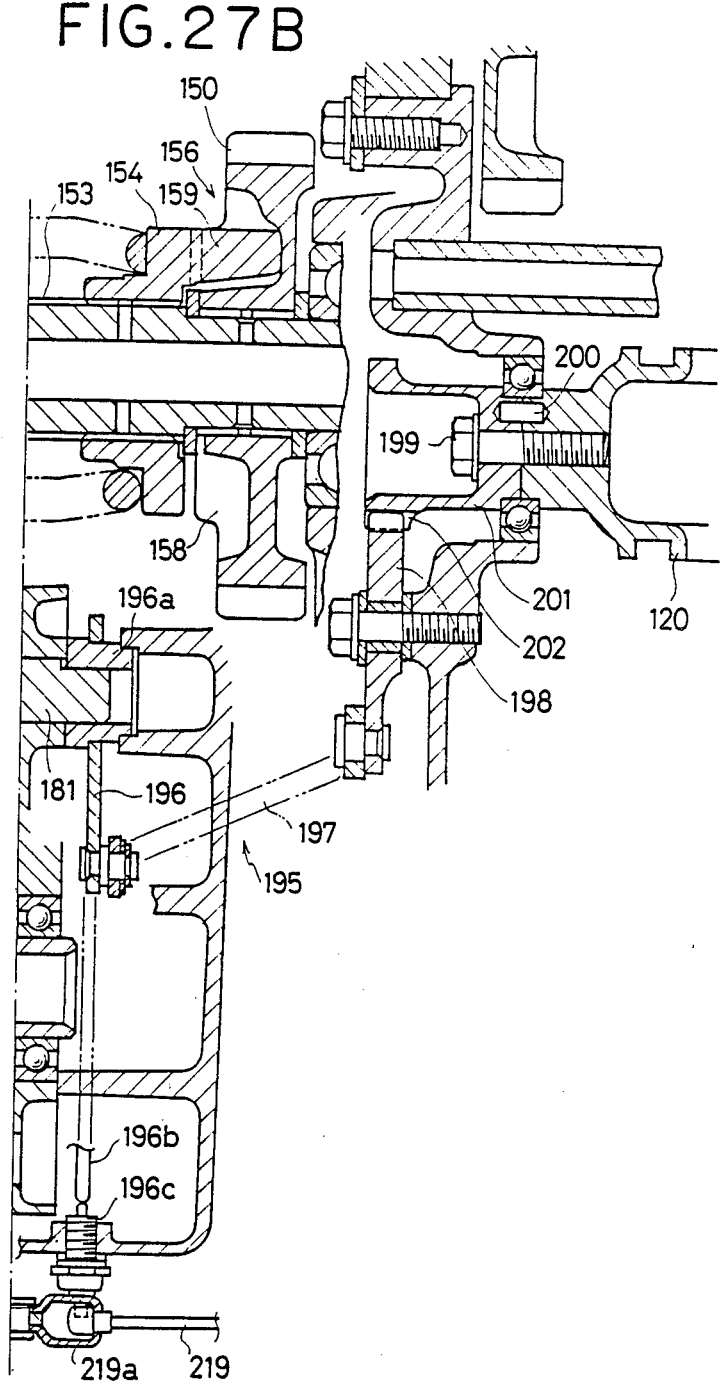

The output shaft 121 has at its right end a driven gear 150. This driven gear 150 is engaged with an output gear 151 fixed on the left end of the counter shaft 119. The output shaft 121 has further freely engaged thereon a reverse driven gear 152 which is driven in the backing operation. As shown in FIG. 27, a spline 153 of the output shaft 121 has engaged thereon sliders 154, 155 which are pressed on both sides by means of a compression spring 153a, thus forming a cam damper 156 by the driven gear 150 and the slider 154. The cam damper 156 consists of a concave-convex surface formed by projecting portions 158, 159 on the side surfaces of the gear 150 and the slider 154, respectively. When a load or reverse torque is applied as shocks, the projecting portion 159 shifts along the side surface of the other projecting portion 158 to cause the regression and relative rotation of the slider 154, thereby causing a damping effect.

Between the other reverse driven gear 152 and the slider 155, a torque limiter 160 is formed, which comprises curved surfaces 161, 162 formed respectively on the gear 152 and the slider 155 having the large and shallow slope.

As shown in FIG. 27, the output of the starting motor 104 is transmitted to two steps of planetary-type reduction gearing 163 to be reduced in each step, wherein the output of the first step is transmitted to the starting system while the output of the second step is transmitted to the reverse driving system.

The first step of planetary-type reduction gearing 163 comprises a sun gear 164 fixed to the rotational shaft of the starting motor 104, a planetary gear 168 carried by a pin 167 supported by a bearing 165 by means of a carrier 166, a ring gear 168a, fixed to the housing and so on. A starting shaft 170 formed as the output side of the carrier 166 has a solar gear 171 of the second step and has connected thereto a starting gear 172 by means of a spline 173, the starting gear 172 driving the aforementioned starting gear 125 through an idler 174.

The second step of planetary-type reduction gearing comprises the sun gear 171, a hollow reverse output shaft 176 freely engaged with the starting shaft 170 and supported from outside by means of a bearing 175, a planetary gear 178 supported on a carrier 176a integral with the output shaft 176 by means of a pin 177, a ring gear 178a fixed to housing 101 for further reducing the rotative speed of the sun gear 171 reduced in the former or first step to transmit the reduced speed to reverse output shaft 176. A reverse motive gear 179 is cut out on this reverse output shaft 176.

Figure 28:
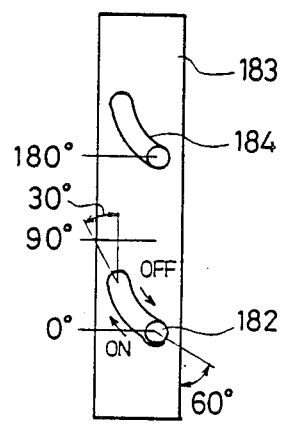
FIG. 28 is a developed view of a reverse drum.

A back-driving clutch device 180 is provided between the starting shaft 170 and the final output shaft 121 for transmitting the rotation of the reverse motive gear 179 to the output shaft 121. This device 180 and the second step of the planetary-type reduction gearing 163 constitute the back-driving system, the device 180 driving the reverse driven gear 152. The device 180 comprises a reverse shaft 181, a pin 182 and a reverse drum 183 provided with a slant groove 184. The pin 182 and the slant groove 184 constitute a cam driving mechanism as shown in FIG. 28. Another pin 182a and housing groove 182b define a linear guide. Consequently, the reverse drum 183 shifts in the axial direction due to the rotation of reverse shaft 181. The drum 183 has thereon a sleeve 188 rotatably held by means of the needle bearing 185, and the rings 186 and 187. The sleeve 188 has a slide gear 189, a spline 190 cut out on its circumference and an interlocking gear 192 engaging with the spline 190. Accordingly, when the reverse shaft 181 is rotated, the reverse drum 183 shifts in the axial direction, and the slide gear 189 held thereby reciprocates into and out of engagement with the reverse driven gear 152 provided on the output shaft 121. In this case, the interlocking gear 192 is prevented from shifting by projections 193, 194 extending from the housing 101 and thus engages normally with the reverse motion gear 179 to continue its rotation, which causes the continuous rotation of the slide gear 189.

In order that the shift of the slide gear 189 to its engaging position by the reverse shaft 181 is limited to the neutral condition of the transmission gear box 177, an inhibiting device 195 is interposed between the reverse shaft 181 and the transmission gear box 171. As shown in FIG. 27, the reverse shaft 181 has fixed thereon a lever 196 at its boss portion 196a, and this lever 196 is connected to a pawl 198 through a link 197. A locker 201 fixed on shift drum 120 by screw 199 and pin 200 is provided with a recess 202, which the pawl 198 engages only when the shift drum 120 of the transmission gear box 117 is located in the neutral position. Only in this case, the slide gear 189 engages with the reverse auxiliary gear 152. For the purpose of displaying the reverse position, a cam 196b is connected to the lever 196, and a reverse switch 296c is fixed to the housing 101. Signals are transmitted to the indicator of meter panel through said switch.

Figure 30:
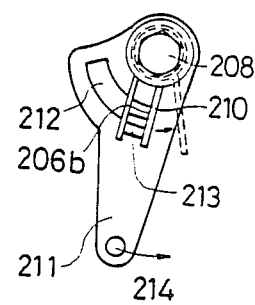
FIG. 30 is a front view of a reverse arm.
Figure 29:
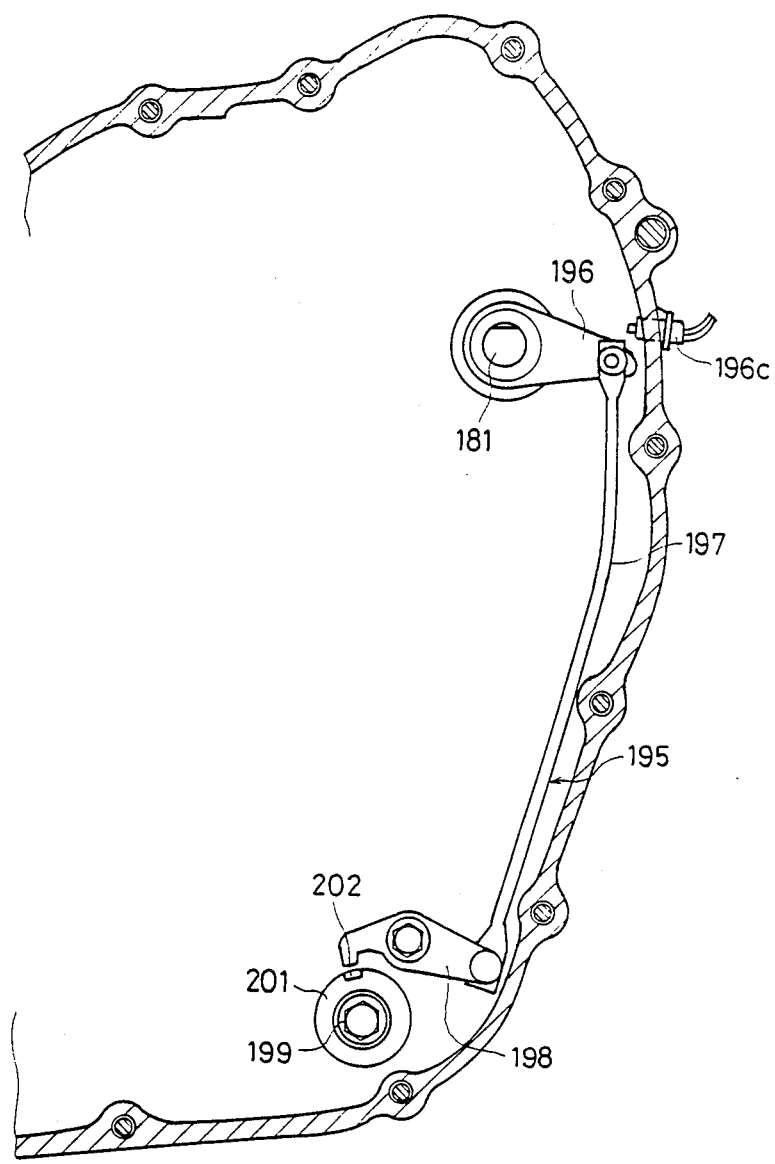
FIG. 29 is a front view of a restricting device connected to a reverse clutch device.

A collar 205, a cross arm 206, and a collar 207 are fixed on the left side end of the reverse shaft 181 by a screw 208. A return spring 209 engages with the inner finger 206a of said cross arm 206. This affords rotational power to the reverse shaft 181, pressing the reverse drum 183 to its left side position. Another spring 210 is provided freely on the collar 207 and engages with both side surfaces of the outer finger 206b of the cross arm 206 as shown in FIG. 30.

Figure 31:
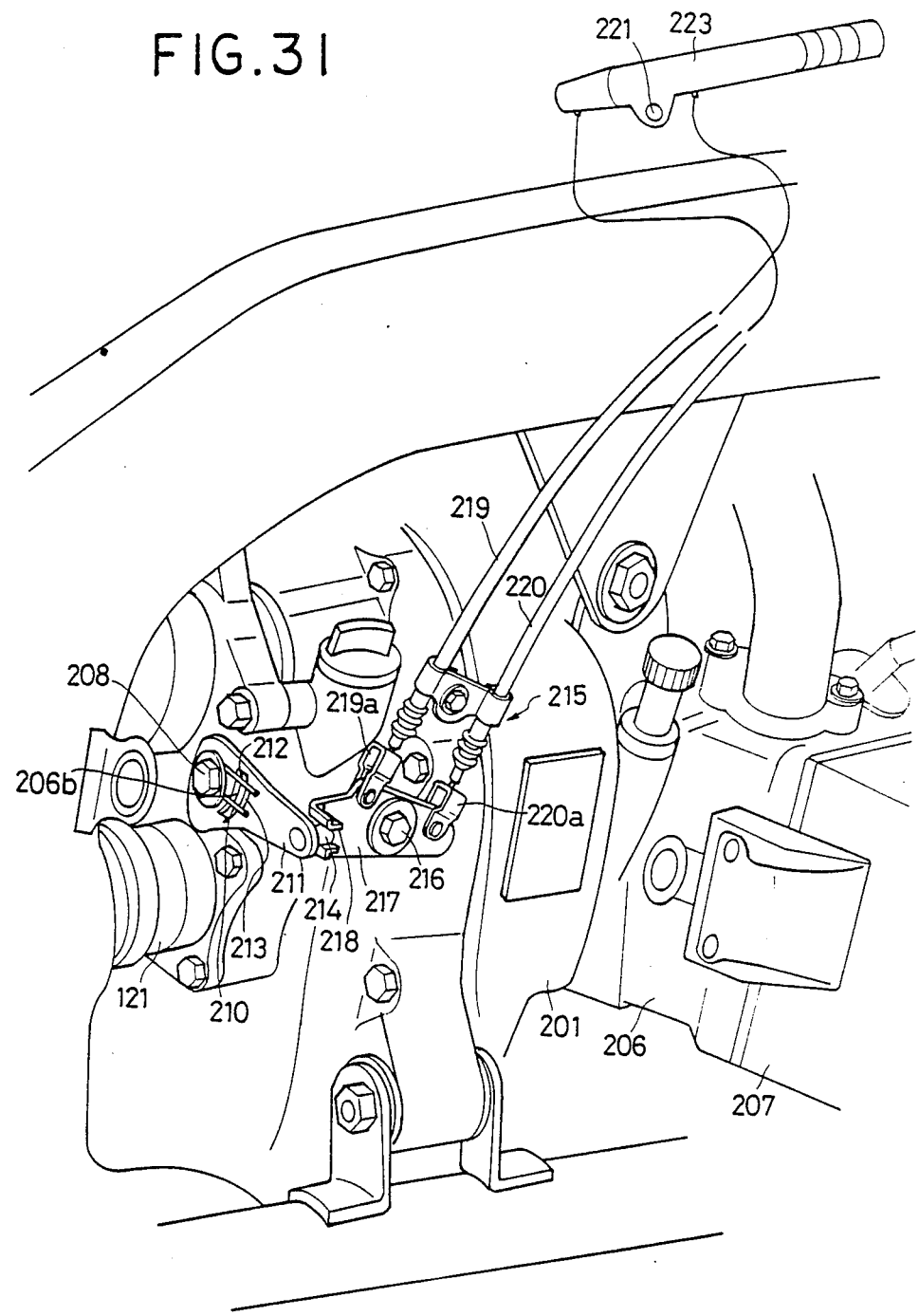
FIG. 31 is a perspective view of a reverse shifter.
Figure 32:
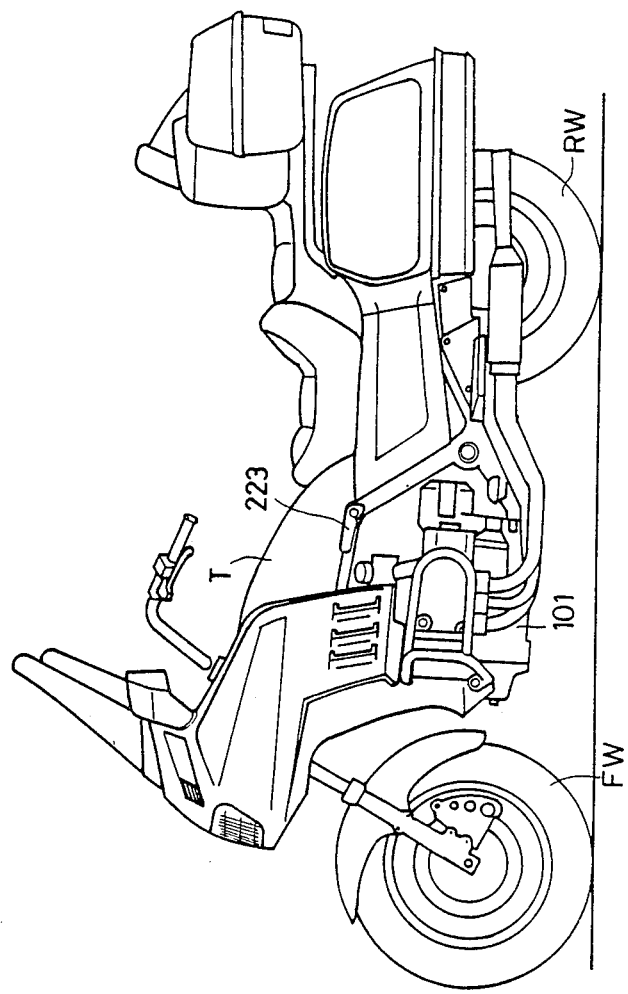
FIG. 32 is a side view of a motorcycle equipped with the power unit shown in FIG. 25.
Figure 33:
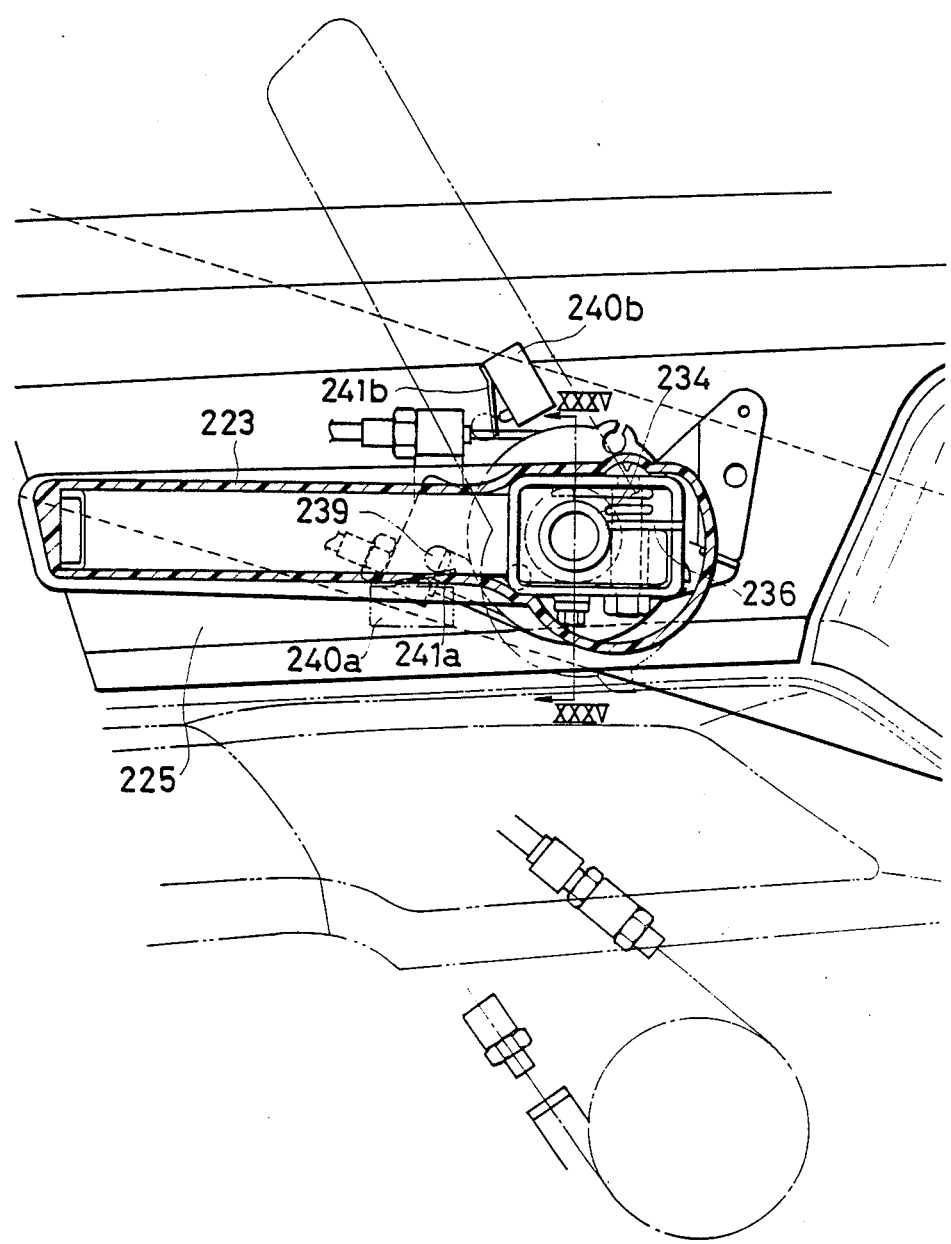
FIG. 33 is an enlarged side view thereof illustrating the major component parts thereof.
Figure 34:
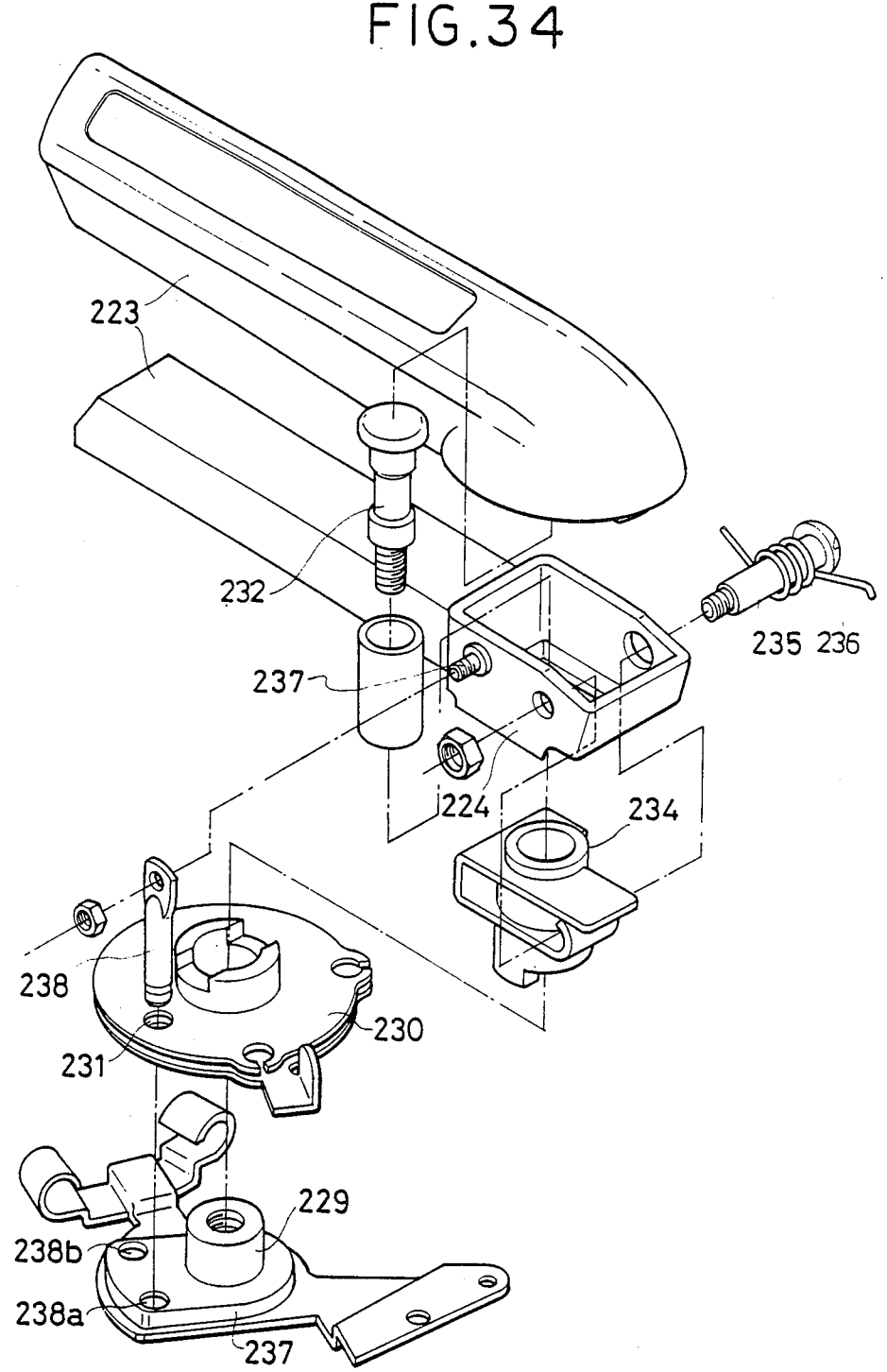
FIG. 34 is a disintegrated perspective view thereof.
Figure 35:
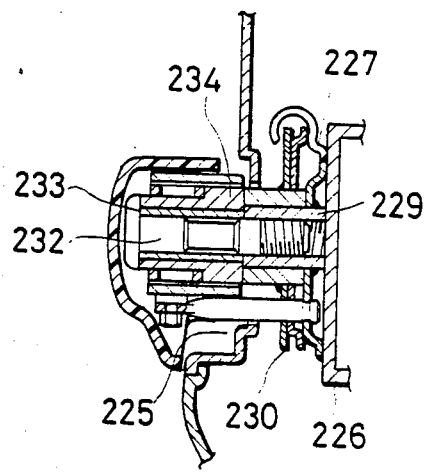
FIG. 35 is a sectional view taken along the line XXXV—XXXV of FIG. 33.

A reverse arm 211 is pivoted on the collar 207. The reverse arm 211 is provided with a window 212 and a plush finger 213. A finger 206b of the cross arm 206 projects through the window 212, and this finger 206b and the push finger 213 are pinched by two legs of the spring 207. The reverse arm 211 has fixed thereon a pivot 214 as shown in FIG. 31, to which a reverse shifter 215 is connected. The reverse shifter 215 comprises a lever 217 pivoted on the housing 101 by a pin 216 and pinching the pivot 214 by a pair of projections 218 thereof, cables 219, 220 connected to said lever 217 by connecting members 219a 220a on both sides of pin 216, and a reverse handle 223 pivoted to the vehicle body by a pin 221 and connected with the respective other ends of said cables on both sides of the pin. The reverse handle 223 is located retractably in the lateral recessed portion of the body, for example below the fuel tank T, and is pulled out laterally and pulled upwards for reversing operation.

A stay 227 is securely fixed to the body frame 226 on the inner side of the recess 225 in which is housed the reverse handle 223 and a pulley 230 is rotatably fitted to a sleeve 229 of the stay 227 in such a way that the pulley can be rotated about an axis of the widthwise direction of the vehicle body. A boss 234 is pivotably fixed through a color 233 with a screw 232 to the sleeve 229 and the base portion 224 of the reverse handle 223 is pivotably fixed to the boss 234 with a bolt nut 235 in the direction perpendicular to the center of rotation of the pulley 230.

The bolt nut 235 is loaded with a coiled spring 236 whose ends are engaged with the boss 234 and the reverse handle 223 so that the reverse handle 223 is forced into the recess 225 under the force of the coiled spring 236.

A shaft 237 is extended from one side surface of the portion 224 of the reverse handle 223 and an engaging pin 238 pivoted by the shaft 237 is extended through a through hole 231 of the pulley 230 and fitted into one of two holes 228a and 228b of the stay 227. A projection 239 is extended from the inner surface of the reverse handle 223 in such a way that when the reverse handle is brought to its uppermost or lowermost position, the projection 239 pushes a switch actuating member 241a or 241b of a limit switch 240a or 240b.

When the reverse handle 223 is pulled laterally out of the recess 225, the engaging pin 238 which has been in engagement with the lower engaging hole 228a of the stay 227 is pulled out of it so that the reverse handle 223 becomes vertically swingable about the set screw 232. Therefore the reverse handle 223 can be pulled upwardly to start the reverse drive. If the reverse handle 223 is not completely pulled upwardly the engaging pin 238 remains in contact with the side surface of the pulley 230 so that the reverse handle 223 cannot be pushed. But when the reverse handle 223 is pulled upwardly to its uppermost position, the engaging pin 238 is aligned with the upper engaging hole 228b so that the reverse handle 223 can be pushed.

Only when the reverse handle 223 is brought to its lowermost or uppermost position, either of the limit switch 240a or the limit switch 240b is turned on so that the rotation of the starter motor 4 becomes possible, but when the reverse handle 223 is at a position between its uppermost and lowermost position, it is impossible to start the starter motor 4.

Figure 36:
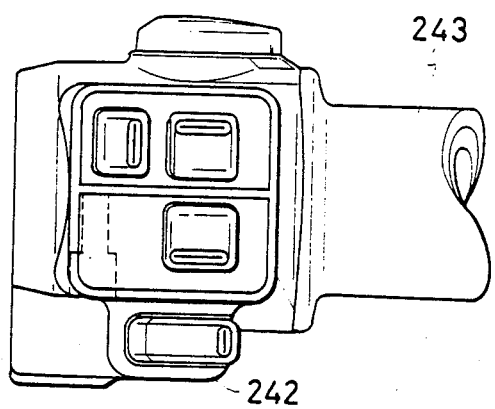
FIG. 36 is a front view of a starter switch.

As shown in FIG. 36, the starter switch 242 is disposed within the right handle grip 243.

By rotating the reverse handle 223 on the reverse side, the reverse arm 211 is rotated in the direction of arrow 224 of FIG. 30 through lever 217 of the reverse shifter 215, whereby one leg of the spring 210 is rotated by the push finger 213 in the same direction and another leg of the spring 210 presses the finger 206b in the same direction. Therefore, the reverse shaft 181 is subjected to a rotational torque in the same direction through the cross arm 206.

When the transmission gear box 117 and consequently the shift drum 120 are located in the neutral position, the lever 196 is rotated by the reverse shaft 181, and the pawl 198 is put into the recess 202 of the locker 201 through the link 197 thereby to lock the shift drum 120 in the neutral position. At the same time, the reverse drum 183 has been advanced by the pin 182 and the slide gear 189 engages with the reverse driven gear 152 on the output shaft 121. By pushing the switch of the starting motor 104, the rotation thereof is reduced through two steps of the planetary-type reduction gear 163, and is additionally reduced through the combinations of reverse motion gear 179—interlocking gear 192 and slide gear 189—reverse driven gear 152, thereby to drive in reverse the output shaft 121 and consequently the rear wheel at low speed.

In this moment, the starting shaft 170 rotates also at low speed through the first step of the planetary-type reduction gear 163 thereby to rotate the starting input gear 125 provided on the crankshaft 113 through the starting gear 172 and the idler 174. However, the rotational speed thereof is about 550 rpm, while the idling rotational speed of the crankshaft 113 is about 800 rpm, so that the rotational interference of the starting system can be avoided due to the one-way clutch 123.

When the shift drum 120 is not located in the neutral position, the pawl 198 does not engage with the recess 202. In this case, when rotating the reverse handle 223, the reverse arm 211 is moved and presses the finger 206b through the spring 210, but the reverse shaft 181 of the clutch device 180 for driving in reverse does not rotate and the slide gear 189 cannot be shifted. When the shift drum 120 is shifted to the neutral position, it becomes possible to push out the reverse shaft 181 by the spring 210 for rotation and to engage the slide gear 189 with the gear 152.

When carrying out the normal starting of the above-described construction, the main clutch 135 is cut, with the shift drum 120 in neutral position and the reverse handle 223 in a normal position. Consequently, the reverse shaft 181 has been rotated to its inactive position by the spring 210, where it is pressed and stopped by the return spring 209. By operating the starting motor 104 in this condition, rotational moment is transmitted from the reverse motive gear 179 of planetary-type reduction gear 163 to the interlocking gear 192, but the slide gear 189 is located in the left side position, so that the reverse driven gear 152 cannot be driven.

On the other hand, rotational moment is transmitted from the first step of planetary-type reduction gear through the starting shaft 170, the spline 173, the starting gear 172 and the idler 174 to the starting input gear 125, thereby to rotate the crankshaft 113 through the one-way clutch 123 to start the engine. After starting, forward running can be carried out by operating of the main clutch 135 and the shift drum 120.

When it is desired to drive the vehicle in reverse, it is first stopped, then transmission gear box 117 is located in the neutral position and the reverse handle 223 is rotated to the reverse position. The torque is transmitted from the lever 217, the reverse arm 211 and the spring 210 to the reverse shaft 181, further to the lever 196, the link 197 and the pawl 198 of the inhibiting device 195, so that the pawl 198 drops into the recess 202 of the locker 201 provided integrally on the shift drum 120, thereby to lock the shift drum in the neutral position and rotate the reverse shaft 181 by a predetermined angle. Consequently, the clutch device 180 for reverse is operated to move the drum 183 through the pin 184 and engage the slide gear 189 with the reverse driven gear 152. Then, by pushing the starting switch to activate the starting motor 104, low speed rotation reduced by two steps of planetary-type reduction gear 163 is transmitted as reverse rotation through the reverse motive gear 179, the interlocking gear 192, the slide gear 189, the reverse driven gear 152 and the torque limiter 160 up to the output shaft (121), thereby to drive the vehicle in reverse.

It is to be noted that the AC generator 103 is normally driven by the crankshaft 113 through the elastic joint 230 and the gears 231, 232.

What is claimed is:

1. A reverse drive for small vehicles characterize in that an output shaft of a motor independently of a driving internal combustion engine can be coupled to a power transmission system leading from said internal combustion engine to a rear wheel in such a way that the rear wheel is driven in the reverse direction through a reverse clutch for transmitting the power from said motor to said power transmission system only in the reverse direction, and said reverse clutch comprises a slide clutch mechanism which is switched by an operating means which in turn is manually operated by a driver.

2. A reverse drive for small vehicles as set forth in claim 1 further characterized in that said operating means comprises a lever manually operated by driver and wire cable connected to said lever.

3. A reverse drive for small vehicles as set forth in claim 2 further characterized in that said wire cable is provided with a forced opening and closing mechanism.

4. A reverse drive for small vehicles as set forth in claim 2 further characterized in that when said lever is located at an intermediate position, the rotation of said starter motor becomes impossible or is inhibited.

5. A reverse drive for small vehicles as set forth in claim 2 further characterized in that said slide clutch mechanism which coacts with said wire cable is provided with a lost motion mechanism.

6. A reverse drive for small vehicles as set forth in claim 2 further characterized in that said lever is disposed at one side of a tank or a shelter on the opposite side of a brake application means.

7. A reverse device for small vehicles as set forth in claim 1 further characterized in that said operating means comprises a solenoid which is supplied with an electric current from an actuating switch.

8. A reverse device for small vehicles as set forth in claim 1 further characterized in that when said slide clutch mechanism engages, it interrupts the transmission of the power to the other clutch.

9. A reverse device for small vehicles as set forth in claim 1 further characterized in that upon depression of a switching or shift means on the clutch lever, said operating means switches or shifts said slide clutch mechanism.

10. A reverse drive for small vehicles characterized in that an output shaft of a starter motor independently of a driving internal combustion engine can be coupled to a power transmission system leading from said internal combustion engine to a rear wheel in such a way that the rear wheel is driven in the reverse direction; in said starter motor and said power transmission system, a starter clutch for transmitting the power from the said starter motor to said internal combustion engine only in the starting direction and a reverse clutch for transmitting the power from said starter motor to said power transmission system only in the reverse direction in which said rear wheel is rotated in the reverse direction opposite to said starting direction are juxtaposed; and a switch for actuating and controlling said starter motor is disposed adjacent to a handle grip.

11. A reverse drive for small vehicles as set forth in claim 10 further characterized in that said switch comprises a starter motor switch.

12. A reverse drive for small vehicles as set forth in claim 10 further characterized in that said switch is disposed adjacent to a clutch lever.

13. A reverse drive for small vehicles characterized in that an output shaft of a starter motor independently of a driving internal combustion engine can be coupled to a power transmission system leading from said internal combustion engine to a rear wheel in such a way that the rear wheel is driven in the reverse direction; in said starter motor and in said power transmission system, a starter clutch for transmitting the power from said starter motor to said internal combustion engine only in the starting direction and a reverse clutch for transmitting the power from said starter motor to said power transmission system only in the reverse direction in which said rear wheel is rotated in the reverse direction opposite to said starting direction are juxtaposed or incorporated; and either of said starting clutch or said reverse clutch comprises a one-way clutch whereby the power from said starter motor is used for starting the internal combustion engine or for reversing said rear wheel by changing rotational direction of said starter motor.

14. A reverse drive for small vehicles as set forth in claim 13 further characterized in that said starting clutch or said reverse clutch is provided with a lead-screw drive for actuating a slide clutch mechanism upon rotation of said starter motor.

15. A reverse drive for small vehicles as set forth in claim 13 further characterized in that said starting clutch or said reverse clutch comprises a slide clutch mechanism which can be switched or shifted by an operating means which in turn is operated by a driver.

16. A reverse drive for small vehicles as set forth in claim 15 further characterized in that said operating means comprises a solenoid supplied with an electric current by an actuating switch.

17. A reverse drive for small vehicles characterized in that an output shaft of a reversible starter motor independently of a driving internal combustion engine can be coupled to a power transmission system leading from said internal combustion engine to a rear wheel in such a way that the rear wheel is driven in the reverse direction; in said starter motor and said power transmission system, a starting clutch for transmitting the power from said starter motor to said internal combustion engine only in the starting direction and a reverse clutch for transmitting the power from said starter motor to said power transmission system only in the reverse direction in which said rear wheel is rotated in the reverse direction opposite to said starting direction are juxtaposed or incorporated; and there is provided a reduction gear for decreasing the rotational speed of said starter motor.

18. A reverse drive for small vehicles as set forth in claim 17 a planetary gear drivingly coupled to said starter motor and an intermediate shaft having a clutch mechanism disposed between the shaft of said starter motor and said output shaft.

* * * * *

UNITED STATES PATENT AND TRADEMARK OFFICE
CERTIFICATE OF CORRECTION

PATENT NO. : 4,763,538
DATED : August 16, 1988
INVENTOR(S) : HARUYASU FUJITA et al.

It is certified that error appears in the above-identified patent and that said Letters Patent is hereby corrected as shown below:

In claim 4, Col. 20, line 33, delete "starter".

Signed and Sealed this

Third Day of October, 1989

Attest:

DONALD J. QUIGG

*Attesting Officer*      *Commissioner of Patents and Trademarks*